United States Patent [19]

Brown et al.

[11] Patent Number: 4,854,150
[45] Date of Patent: Aug. 8, 1989

[54] METHOD OF BENDING AND FORMING HEATED TUBULAR WORKPIECES

[75] Inventors: Peter A. Brown, Cambridge; Kenneth N. Jenkins; Paul A. Pouget, both of Chatham, all of Canada

[73] Assignee: Rockwell International Suspension Systems Company, Ontario, Canada

[21] Appl. No.: 250,234

[22] Filed: Sep. 28, 1988

Related U.S. Application Data

[62] Division of Ser. No. 943,468, Dec. 19, 1986, Pat. No. 4,781,054.

[51] Int. Cl.$^4$ .............................................. B21D 11/04
[52] U.S. Cl. ........................................ 72/369; 72/306; 72/383
[58] Field of Search .......................... 72/306, 369, 383

[56] References Cited

U.S. PATENT DOCUMENTS 3,472,055 10/1969 Goble ................................ 72/369 X

FOREIGN PATENT DOCUMENTS 1280553 10/1968 Fed. Rep. of Germany ........ 72/369
70926 4/1983 Japan ..................................... 72/369
691227 10/1979 U.S.S.R. ............................... 72/369

Primary Examiner—Timothy V. Eley
Attorney, Agent, or Firm—Bacon & Thomas

[57] ABSTRACT

A novel method and apparatus for forming stabilizer bars for engine driven land vehicles starting from tubular or rod steel stock material to provide predetermined shapes which are hardened by heat treating, forming and quenching into permanent forms. The method comprises of heating bar ends and forging in forging presses so that one of the eyed ends after heating to 1150°–1240° C. for forging and piercing is formed. The same series of heating, forging and piercing steps are carried out at the other end to thereby provide a new strengthened eyehole structure at each end. The bar is then heated and formed on a forming table. The heating is carried out at 870°–910° C. and the bending on the forming table is carried out. A drain aperture is pierced in the side of the tubular stock to drain the quenching oil which enters the tube during quenching after forming the stabilizer bar. The novel forming board is provided with twelve cylinders. The formed bar with the end eyeholes and aperture is then submerge quenched in quenching oil. Thereafter the oil is removed and tempering process is carried out in order to assure and control the transformation of martensite into tempered martensite. Modified end forms are disclosed including a swaged form and one with end inserts at each end.

9 Claims, 17 Drawing Sheets

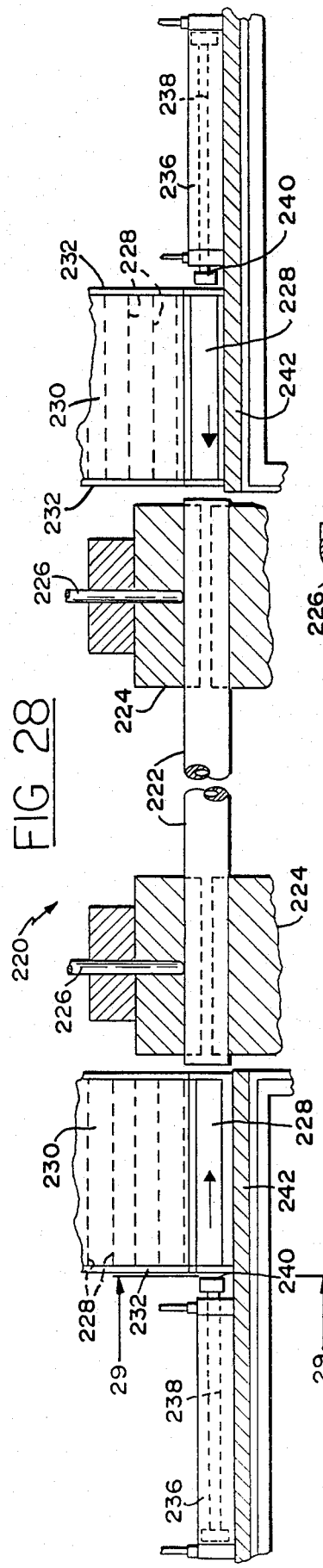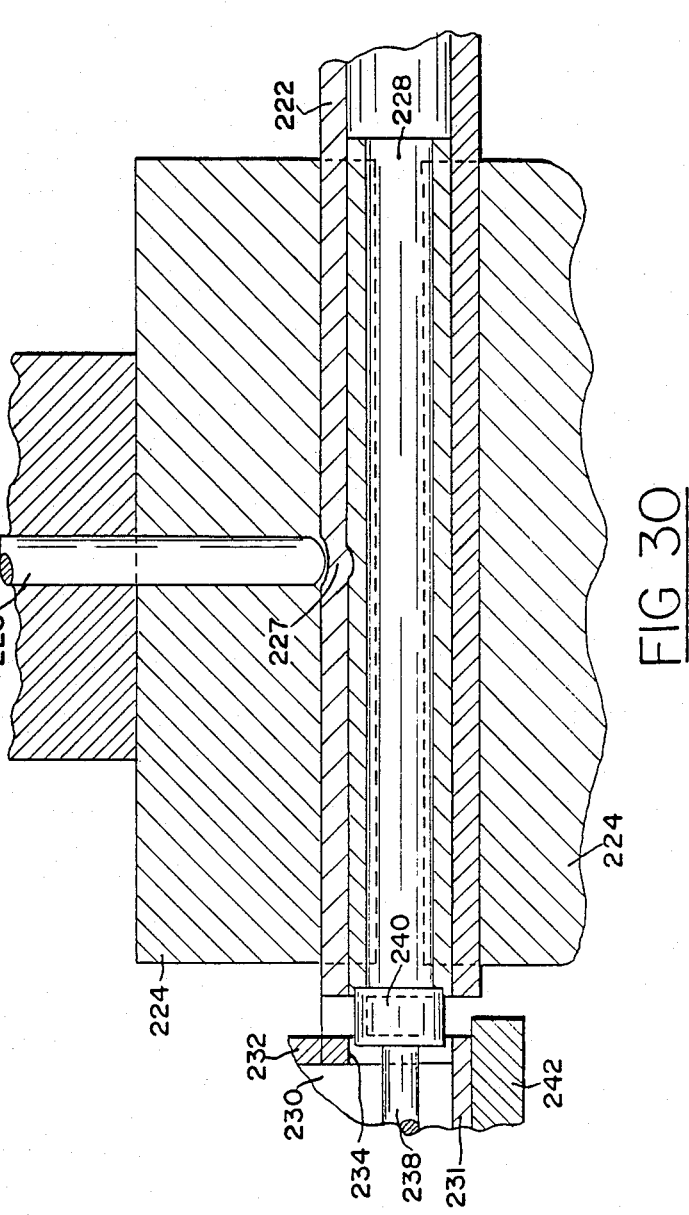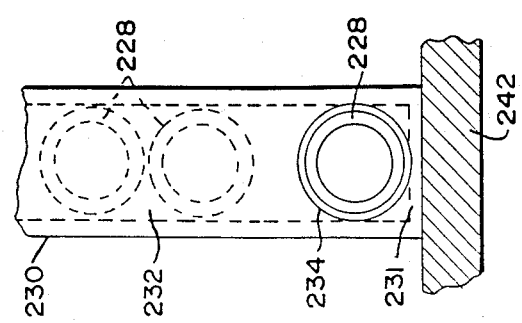

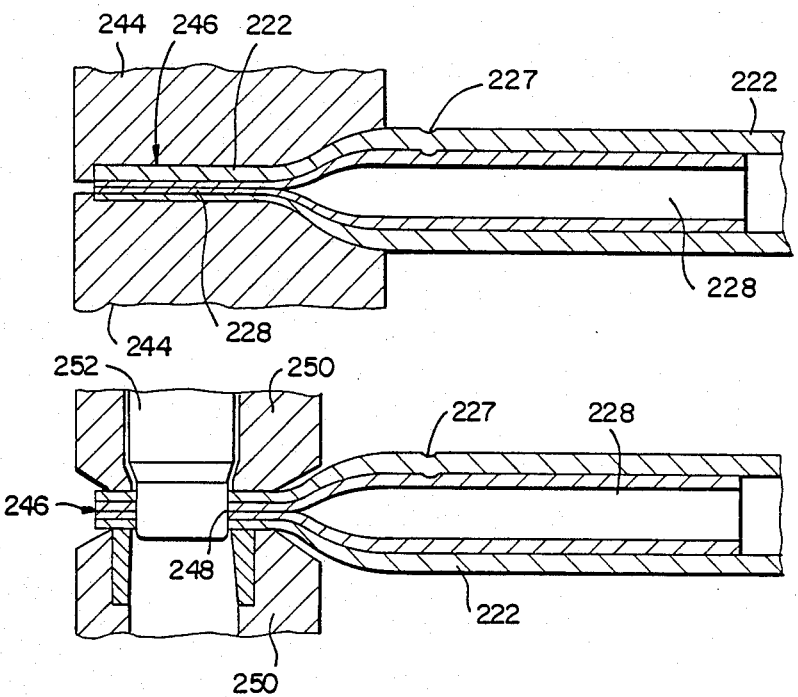
FIG. 31
FIG. 32
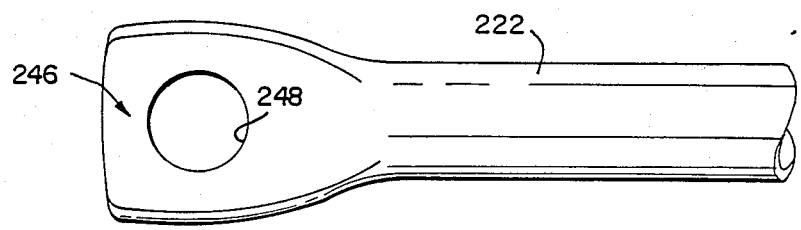
FIG. 33
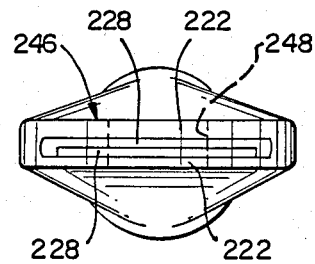
FIG. 34

METHOD OF BENDING AND FORMING HEATED TUBULAR WORKPIECES

This application is a division of application Ser. No. 943,468, filed Dec. 19, 1986, now U.S. Pat. No. 4,781,054.

BACKGROUND OF THE INVENTION

1. Field of the Invention

This invention lies in the field of automatic and semi-automatic forming apparatus and in the field of methods of using such apparatus to carry out a series of forming operations to provide stabilizer bars or sway bars in predetermined shapes as are determined by the manufacture of automobiles, trucks and trailers and includes methods and apparatus for stiffening and hardening the formed articles to produce permanent strengthened stabilizer bar products.

This invention relates more specifically to tubular vehicle stabilizer bars having end portions of strengthened constructions which have an opening adapting the ends of the bar to be bolted to the frame of the vehicle. The end portions are strengthened by utilizing swaging techniques or tubular inserts.

2. Description of the Prior Art

Urschel, U.S. Pat. No. 2,318,344, shows an apparatus for automatically forming vehicle stabilizer bars. The device comprises a plurality of cylinders mounted on a support which are sequentially actuated to bend the initially straight, heated bar into the desired configuration. The Urschel apparatus also includes quenching means to spray a cooling liquid onto the bar after it has been bent so as to hold the bar in its final shape as it cools.

Brogren, U.S. Pat. No. 2,565,717, discloses a tube bending apparatus wherein the bending mechanism is mounted onto a board-like support structure.

Sassak, U.S. Pat. No. 3,362,209 and Foster et al, U.S. Pat. No. 4,131,003, show fully automatic (Sassak) or semi-automatic (Foster et al) control systems for bending apparatus.

Brown, U.S. Pat. No. 2,955,639, discloses a simple device for bending pipe in which a shoe is held against movement of the plunger to provide a single, rather than a compound bend.

It has long been recognized that tubular stabilizers for vehicles may require special heat treatments or separate cold working treatments in order to strengthen the ends of the stabilizer bars and examples of strengthened pipe ends are found in the prior art in which both cold working and hot working may be needed. For example, Tirone, U.S. Pat. No. 3,354,689, shows the piercing of bar stock or rod stock, shows drilling or piercing at the end to provide a beveled inset in the punched area at the end of the stock.

Another example for providing an eye at the end of a blank is found in the patent to Stout, U.S. No. 3,967,487, in which a special forming of the end of a leaf spring blank is carried out in a hot forging operation after which there is a hole punching operation to form eyes or openings at each end of the blank.

Still another example of a process for forging a tubular metal blank into a flattened shape in which the temperature condition for working is from 550° to 1250° C. is shown in the patent to Shinosaki, et al, U.S. No. 4,527,411, but the flattening in this patent is different from that of the present invention.

Further, it is known in the prior art that the steps of drop forging followed by trimming to cut away flash metal which is produced during forging and then followed by swaging to produce a predetermined increase in thickness is those parts subject to greater stress has been utilized in the forging of hammer heads as taught by Vlchek, U.S. Pat. No. 1,838,470.

Mogford et al in U.S. Pat. No. 1,823,158, shows the method of strengthening the ends of a hollow axle by the steps of forging and upsetting the end portions of the tubular pre-form used in making the axle, then inserting a plug after the metal has been upset and thereafter forging the end to provide a uniform joining of the insert with the outer tubular portion to facilitate the formation of a strengthened inner portion adjacent the apertured end of the axle.

In U.S. Pat. Nos. 4,372,576, Inoue, 4,378,122 and 4,429,899, Ohno et al, although stabilizer bars are shown which are formed of curved welded metal pipe, in each of these patents the end portion of the stabilizer bar is the same. In Inoue, U.S. Pat. No. 4,372,576, the seam of the welded pipe is located in a critical position which is determined as a result of the relationship between the thickness of the pipe to the outer diameter of the pipe and the stabilizer of this patent is formed by cold working. In Ohno et al, U.S. Pat. No. 4,378,122 there is a change in the diameter of the interior of the hollow pipe. In Ohno et al, U.S. Pat. No. 4,429,899 there is a separate portion section which is formed near the end of the pipe which is of much smaller diameter and a plurality of curved sections are provided within the pipe to render the manufacturing operation complex. It requires cold forming to provide this complex end shape.

In U.S. Patent to Falk, Pat. No. 3,886,780, a two piece fitting is provided in which an aperture in one of the fittings is shown and which is for the purpose of inserting a tool to disassemble the front element from the back element of the two piece fitting. Insofar as application is aware, there is no other patent which teaches an aperture in a compressed end of a pipe for an eye opening such as forms a part of the present invention.

Another example of a stabilizer bar device which includes specially formed end joints is found in Anderson, U.S. Pat. No. 4,138,141, who discloses separate permanent end joints which are press fitted into the ends of a central tubular member.

DISTINCTIONS OVER THE PRIOR ART

In contradistinction to the patents above mentioned which show various limitations of wall thickness and cold forming for solid cross section end of stabilizer bars such as Ohno, et al, U.S. Pat. No. 4,429,899 or restricted thicknesses having increased dimension in curved areas as in Ohno, et al, U.S. Pat. No. 4,378,122, the novel end construction of the present invention results from carrying out a critical sequence of heating and forging steps using uniformly thick tubing wherein an insert is introduced, the ends are compressed, the eye is punched, and an aperture is formed so that the ends are structurally and dimensionally distinct and different from the ends which are formed for hollow stabilizers in the prior art. The aperture which is punched in this sequence of steps is located adjacent the eye opening and is for the purpose of draining the quenching oil which is used as part of the tempering process during reheating for bending.

An essential characteristic of the present product is the provision of a small drain hole approximately 3/16 inch in diameter immediately adjacent the forged end of the bar so that the quenching oil which is normally present in the interior of the bar after the final bending and quenching is achieved can be drained off. The inventor is not aware that a quenching drain hole has been provided in such forged and bent ends heretofore in the stabilizer bar art. Although a small amount of oil may remain in the bar, a simple shaking or oscillation of the bar is necessary to remove this last trace of oil.

None of the prior patents show an aperture which is punched or drilled in the side of a hollow stabilizer bar for the purpose of aiding the removal of quenching oil after the quenching step.

The quenching step is an essential step in a hot forming operation which is carried out by the present invention. The hot forming step which is needed to form the bars requires heating at specified temperatures for a specified period of time.

Tempering after quench hardening is required by the stabilizer bars in order to achieve the desired mechanical properties of hardness, ductility and toughness of the final product.

The steel grade used by the present invention is AISI 4130 and the appropriate heat treating temperatures and procedures are used to obtain the desired metalurgical properties specified for the stabilizer bar.

Since the forging step of the present invention is needed to provide maximum strength at the ends where the eye hole is formed for attaching the bar to the vehicle frame and since a minimum number of forming operations are required which will not detract from the desired strength by overworking the metal or by excessive thinning, the method of the present invention produces higher quality and higher strength stabilizer bars at lower cost and takes advantage of the strengthening effect which can be achieved by the use of oil quenching methods in heated quenched oil which facilitates the transformation of austenite into martensite.

In contrast to Anderson, which is cold formed and press fitted of three pieces, the present bar is made of one piece. In the form where an insert is introduced the insert is different from that used in Mogford et al, U.S. Pat. No. 1,823,158 in that the insert is introduced and the product forged without any change in the procedure of forging. The insertion of the insert in the present invention is an interference fit. In short, the forging of the ends with or without the insert in the invention is the same and there is no requirement that the metal be upset in the hollow workpiece before the insert of plug is introduced. Not only is the sequence of operation different in the invention than in Mogford et al, but the piercing of the end opening is different in the sequence of operations in the present invention.

In contrast to the curved body forming of the hollow tubular stabilizers described and illustrated in the Inoue and Ohno et al patents referred to above, all of the tubular stabilizers of the present invention are formed without reduction or increase of wall thickness of the stabilizer bar except at the ends of the bar. By carrying out forging, thickening, and bending operations in the body portion of the stabilizer bar away from the ends, Inoue and Ohno et al strengthen the body rather than the ends. The invention provides a method which permits mass production operations to be carried out to thereby lower the costs of manufacture.

Since the critical strengthened areas of the bar are required at the eye hole ends and since each manufacturer has different requirements for the curvature, there is a requirement for low cost bending procedures or methods for carrying out different kinds and styles of curvature on a custom basis to meet the design requirements of different manufacturers. This latter objective is not performed in the Inoue and/or Ohno et al patents since only one style of hollow stabilizer bar is disclosed and illustrated. In contrast, the present invention permits a limited variety of curvatures to be accomplished although all in the same style.

SUMMARY OF THE INVENTION

A semi-automatic method and novel apparatus for manufacturing tubular stabilizer bars which are used in engine driven land vehicles, starting from tubular stock material and finishing with a heat treated bar bent into a double sigmoid shape is disclosed. Tubular stock products which are composed of high strength low carbon steel which requires tempering to go from the martensitic phase into the tempered martensitic phase are utilized as the preferred allow of the invention. A particularly preferred alloy is the alloy having the specification AISI.4130.

At the beginning of the process, the tubular product is cut to predetermined lengths and deburred. One end of the bar is heated to a forging temperature of approximately 1190° C. and then the end configuration is forged. The same procedure is followed for the second end of the bar. The bar is then heated to approximately 890° C. and then placed in the forming table where the bar is formed to the desired shape. The bar is then placed in the quench oil medium before the bar cools to below the austenitic transformation temperature. After the bar has been quenched, the quench oil is drained from the bar and the bar is then transferred to a tempering furnace where the bar is tempered to obtain the desired metalurgical properties. Inspection of the bars during all the manufacturing processes is carried out on a continual basis checking any critical dimensions or properties.

The range of first end heating temperatures of 1150°–1240° C. and forming table heating of 870°–910° C. illustrate the criticality of the heat requirements for the work piece during different manufacturing stages. For flattening the tube ends the higher temperature is essential. Undue thinning of the flattened ends causes the flattened ends to be weakened in a critical part of the bar where it is bolted to the frame of the vehicle. It is a characteristic features and believed to be a unique feature of the invention that the width and thickness of the flattened section of the bar provides maximum strength without undue thinning and without any requirement for side trimming.

Forming operations at the end of the bar following punching of the bolt eye hole and piercing of the drain hole may include bending of the end in order to meet the precise specification of the purchaser of the stabilizer bar. Different frame dimensions and different vehicles require different end dimensions. The only trimming which occurs is end trimming to adjust the curvature and length as required by the customer. Special forming operations of the ends are described in which tubular inserts are introduced into the open ends to thereby increase the cross-sectional areas of the ends. This tubular insert allows for forging the ends of the stabilizer bar without using any side trimming and maintaining the desired eye thickness.

As described in the preferred embodiments the workpiece, after forming on the forming table is quenched in oil and a novel procedure is provided to remove the oil by oscillating the formed bar, any oil which reaches the interior of the bar is shaken out by means of the drain hole earlier provided during the forging operation.

Finally, the product is heated to 470° C.-535° C. in a special tempering operation and after 45 to 50 minutes the martensitic phase is converted into tempered martensite which represents the steel composition having the excellent physical strength and toughness properties as well as resistance to fatigue for stabilizer bar applications. After cooling, final inspection of the finished product serves to assure that all of the manufacturer specifications for the stabilizer bar have been met.

In addition to the foregoing method for converting tubular stock material into a completed stabilizer, special operations of swaging are carried out prior to forging the ends of a stabilizer bar or tubular inserts are inserted into the ends of a bar, both of which increase the wall thickness of the ends giving more material for the forging operation.

As a result a variety of different wall thicknesses produced by the swaging operation and by the insert thickened tubular stock type are provided to meet the variety of needs for different types of vehicles, vehicles which are of the compact type, large passenger vehicles, truck vehicles, and large truck vehicles.

BRIEF DESCRIPTION OF THE DRAWINGS

FIG. 28 is a fragmentary diagrammatic view partly in section showing a device for inserting a reinforcing liner into the ends of the tubular workpiece.

FIG. 29 is an enlarged fragmentary end view of a cassette for dispensing the liner inserts.

FIG. 30 is an enlarged fragmentary vertical sectional view of the end of the tubular workpiece with the liner fixed therein before forging.

FIG. 31 is a fragmentary vertical sectional view on a smaller scale showing the dies for flattening the ends of the tubular workpiece having a reinforcing liner therein.

FIG. 32 is a fragmentary vertical sectional view showing na arrangement for punching an opening through the flattened end of the tubular workpiece.

FIG. 33 is a fragmentary plan view of the completed flattened end of the tubular workpiece having al inner therein.

FIG. 34 is an enlarged end view of the flattened end of the tubular workpiece as seen from the left of FIG. 33.

DESCRIPTION OF THE PREFERRED EMBODIMENTS

Figure 1:
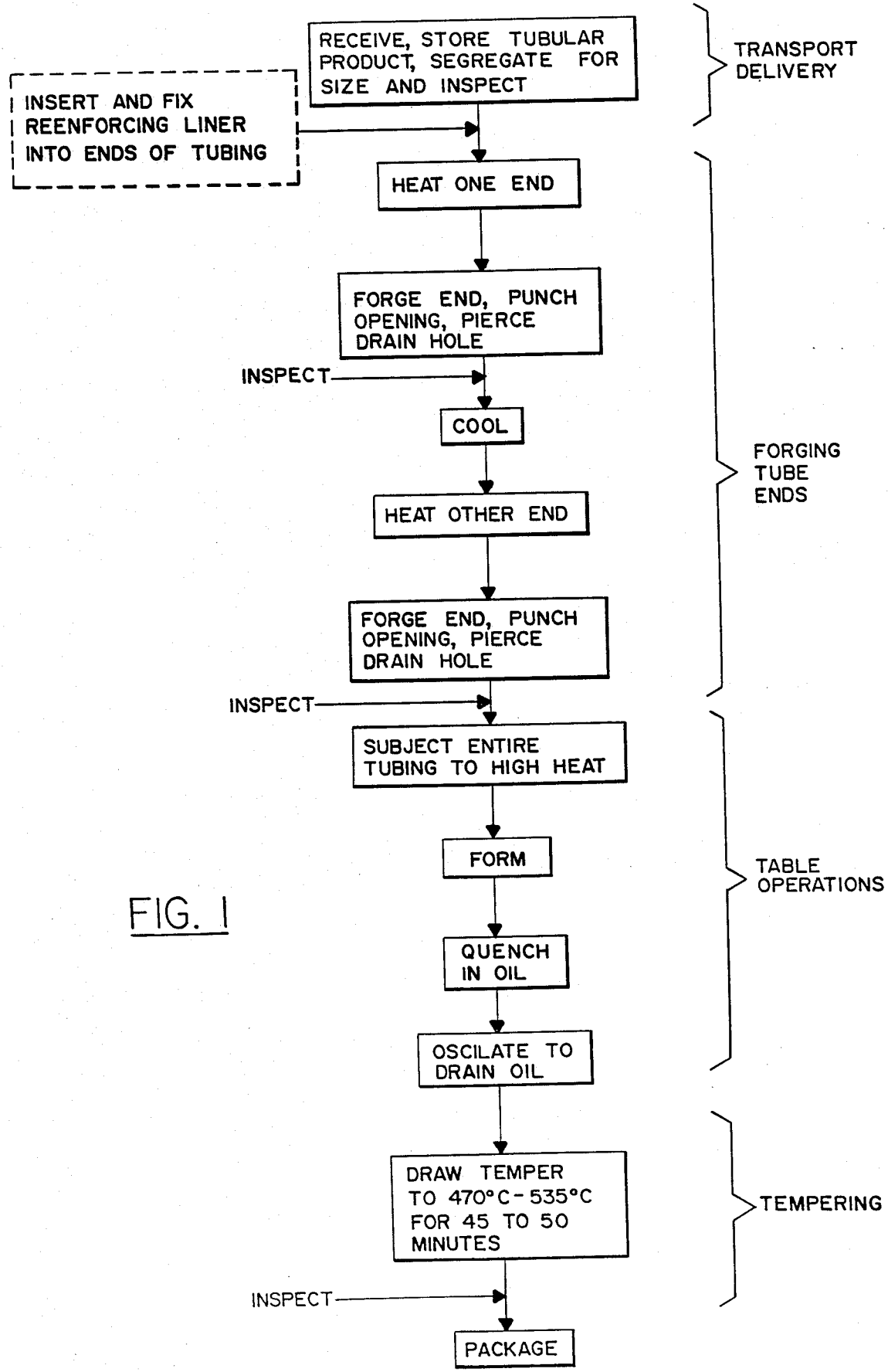
FIG. 1 is a block diagram showing the successive steps for forming a stabilizer bar in accordance with the present invention.

The block diagram in FIG. 1 which shows the successive steps for forming a stabilizer bar in accordance with the invention, serves both as a flow sheet to point to four stages, e.g.

I. Transport delivery
II. Forging tube ends
III. Table operations, and
IV. Tempering.

In Stage I the transport and delivery steps are for the purpose of bringing the workpiece to the processing stages but also as a production tool for coordinating the transport and delivery steps in the handling of the raw tubular stock 50 to stage II. The first and second forging and pressing operations are carried out in stage II where the novel end heating and flattening operations are carried out, first at one end of workpiece 52 and then at the other end of the workpiece 52.

The next stages, stages III and IV as shown in FIG. 1 are the table forming operations and quenching operations in which the stabilizer bar with pierced and flattened ends is hot formed by pressing on the novel forming table apparatus into a compound double sigmoid curvature and in stage IV in which the critical tempering operation is carried out at temperatures of 470° C.–535° C. for 45 to 50 minutes to insure the conversion of martensite into tempered martensite and thereby achieve the required hardness, toughness, fatigue resistance and strength of the finished stabilizer bar.

Also shown in FIG. 1 at the left side of the block diagram is the special operation of insertion and fixing of a tubular insert into the ends of the tubing during the beginning of the stage II operations where flattening and forging of the tube ends occurs. This type of operation is for the purpose of producing a significant increase in the cross-sectional area of the flattened ends as a result of the flattening of the tubular insert together with the ends of the tubes. Additional special operations including swaging may also be done as described in a later section of this description of the preferred embodiments.

The block diagram of FIG. 1 illustrates the aspect the production control in which all of the incoming stock which is received is recorded, records are kept and maintained throughout each of the manufacturing steps and control processes are coordinated with record keeping processes to make maximum utilization of the skills of the operator without burdensome record keeping operations.

I. TRANSPORT DELIVERY

In the first stage of transport delivery, stage I, the tubular material is received cut to the appropriate length. All products of one size can be stored together and bundles tagged to show size, point of origin, identification of lot number, inspection records, etc. Preferably the bundles are deposited into steel cradles and the bands removed when entering the fast heating stages in the slot furnace of stage II. Cradles are used which hold the bundles until the bands are cut and removed and each cradle may contain two to three bundles.

II. FORGING TUBE ENDS

Figure 2:
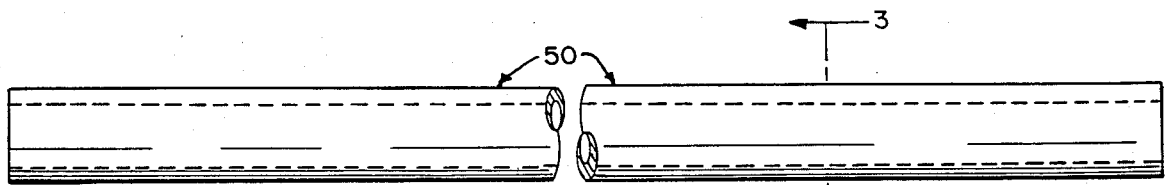
FIG. 2 is a fragmentary side elevational view of the tubular bar before processing.
Figure 3:
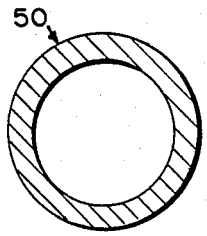
FIG. 3 is an enlarged cross-sectional view of the bar taken along the line 3—3 of FIG. 2.
Figure 4:
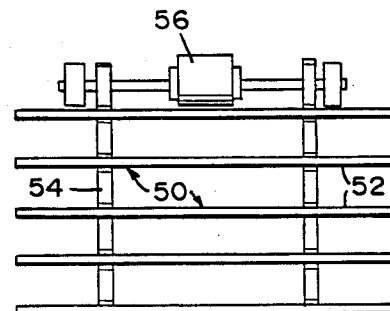
FIG. 4 is a fragmentary diagrammatic plan view of the conveyer and slot furnace for heating the ends of the bar.

The feeding of the work is shown at the incoming end of a slot furnace 58 in FIG. 4 and the tubular stock workpiece 50 shown in FIGS. 2 and 3 moves on the feeding conveyor 54 driven by motor 56 through the slot furnace so that at least 9 inches of the ends of the workpiece 50 are quickly brought to a forging temperature of 1150° C. up to 1240° C. which is the essential temperature range for heating the ends prior to forging.

Figure 5:
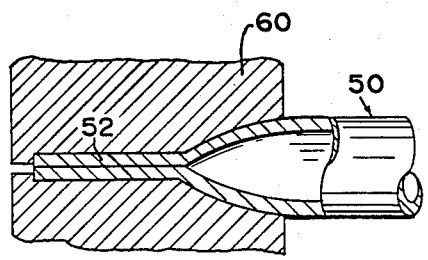
FIG. 5 is a fragmentary side elevational view showing the dies for flattening the ends of the bar.

In FIG. 4 the left end of the stock 50 is shown for the heating step and in FIG. 5 the flattening of the end is shown in the die 60 to form flattened end 52.

The slot furnace of FIG. 4 quickly raises the temperature in a time interval of sufficient duration to permit the adjustment of the travel of the conveyor 54 through the furnace to assure that the minimum temperature of 1150° C. is achieved by the time the workpiece 50 leaves the slot furnace. As shown in FIG. 5, the one end of the tube 50 is flattened at 52 and the heat which is retained aids in forging.

It is important that during the forging step in the die 60 to form the flattened end, the cross-sectional temperature is generally uniform. This uniformity of temperature is achieved in the slot furnace of FIG. 4 and is essential for proper forging and flattening of the workpiece 50 in the die. Since the temperature of the furnace is thermostatically controlled so that the temperature never falls below 1150° C. in the furnace there is assured adequate heat uptake by the end of the workpiece 50 to produce sufficient heating for flattening without any unwarrented thinning. The operator adjusts the speed of the conveyor to insure an accumulation rate of bars ready to forge which match the flattening operation in FIG. 5.

Figure 6:
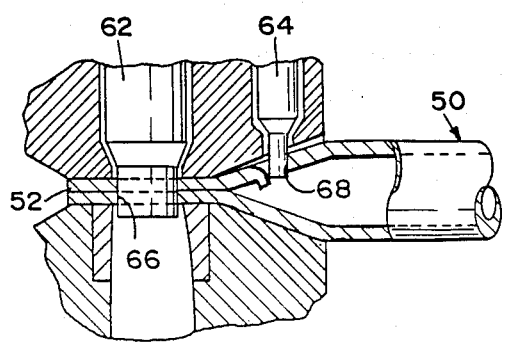
FIG. 6 is a fragmentary sectional view showing an arrangement for punching an opening through the flattened end and piercing a draining hole in one wall of the tubular bar.

The forging and piercing dies shown in FIGS. 5 and 6 accomplish forging and piercing respectively. Flattening in FIG. 5 provides a flattened end 52 by the die 60 quickly followed by a punching and piercing in FIG. 6. The punch 62 cuts out the eye hole 66 and the punch 64 pierces the side of the workpiece 50 to form the drain hole 68.

In an example, this punching and piercing operation is effective to flatten a tube diameter of 1.181 inches outer diameter and 0.898 inch inner diameter to a flattened section in the die in which the thickness is 0.283 inch.

In another example, the width could be specified as being 1.774 inches and in this case the thickness is 0.260 inch.

These two examples illustrate and demonstrate the result of flattening in which the thickness and width can both be predetermined in advance so that the flattening of the end 52 as shown in the die 60 will be carried out to avoid any side trimming whatsoever.

Figure 9:
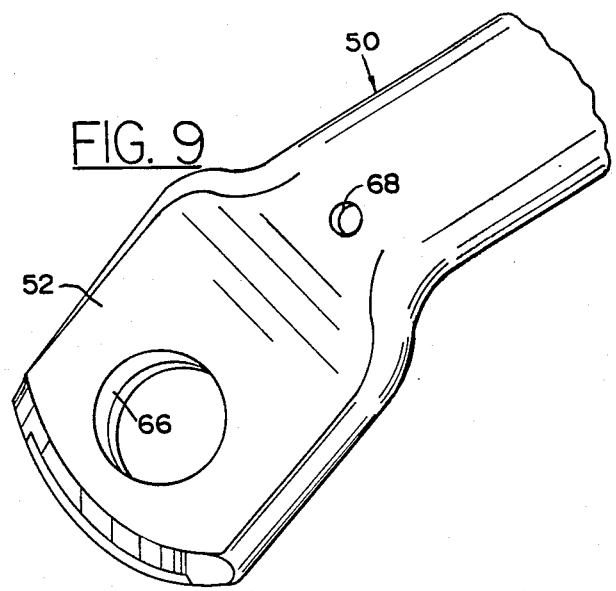
FIG. 9 is a fragmentary pictorial view of a bar having a bent end.

Obviously in the selection of the two examples listed above, the forging may be carried out in a series of passes. As shown in FIGS. 5 and 6 there are two passes, the first pass being the compression pass and the second pass the piercing and punch pass. A third pass may be carried out to provide a bend in the flattened end 52 which is a pierced and punched end. The bent end 52 is shown in FIG. 9.

Figure 7:
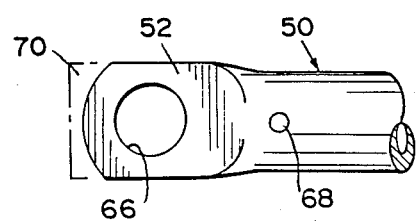
FIG. 7 is a fragmentary plan view showing the end of the bar after it is trimmed.
Figure 8:
FIG. 8 is an enlarged end view as seen from the left of FIG. 7.

The piercing operation shown in FIG. 6 results in a circular hole as shown in FIG. 7 for the eye hole 66 and a circular hole for the drain hole 68.

In the view shown in FIG. 7, cutting is shown and the portion 70 is trimmed off during a trimming step using conventional trimming dies (not shown). The purpose of this trimming is to provide desired end curvature of the flattened end 52 as is required by the manufacturer. Another manufacturer may find the flattened end 52 with the edge represented by the piece 70 left intact and find that the stabilizer bar having this square shape is satisfactory for is specification.

Figure 10:
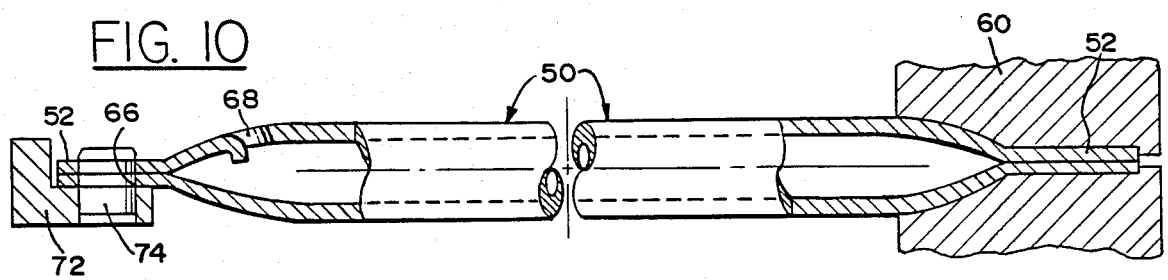
FIG. 10 is an enlarged fragmentary side elevational view, partly in section, showing the dies for flattening the second end of the bar having the first end already flattened.
Figure 10A:
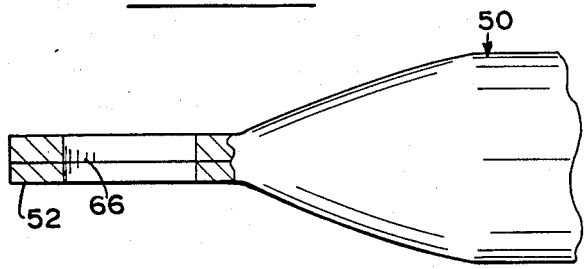
FIG. 10A is an enlarged fragmentary side elevational view, partly in section, showing the unchamfered opening in the flattened end.
Figure 10B:
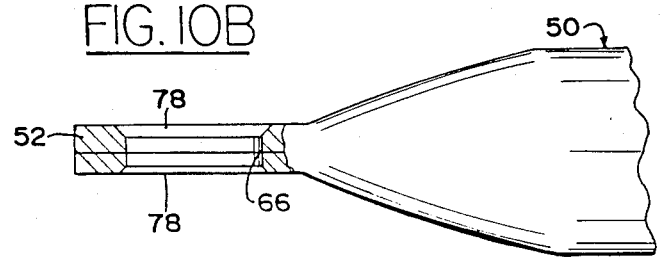
FIG. 10B is an enlarged fragmentary side elevational view, partly in section, showing the opening in the flattened end having a double chamfer.

In the modification of the punching operation which his illustrated in FIGS. 10A and 10B, no chamber if shown in FIG. 10A while a double chamfer 78 on opposite sides of the eye hole are shown in FIG. 10B. The chamfering die (not shown) serves to provide the desired penetration on both sides as shown in FIG. 10B. The chamber is an aspect of manufacture, similar to the curving of the end shown in FIG. 7, which is required by the customer.

In the view shown in Shown in FIG. 10 there is provided a support 72 having a centering post 74 which serves to hold the one end already flattened of the workpiece 50, provided with the eye hole 66 and being held so that the stock having the 9 inch end portion heated to 1150°–1240° C. being compressed at the other end to form the flattened end 52 within die 60. Thus the series of passes shown in FIGS. 5 and 6 are repeated for the other end of the workpiece 50 to thereby provide eye holes 66 and drain holes 68 at both ends.

The orientation of the plane of the eye at the one end, e.g. the left end, is aided by utilizing the support 72 as shown in FIG. 10. In this manner the product will be the straight workpiece 50 with flattened ends 52 at each end having its eye hole 66 and drain hole 68 with the ends being in straight line alignment on each side and with drain holes 68 facing upwardly as shown in FIGS. 9 and 10. There are selections, however, where the drain holes 68 may be on opposite sides of the bar.

As mentioned above, it is frequently required by the customer that the ends by bent to a predetermined angle so that the end 52 is angled on each side for bolting engagement to the frame. In such case, the ends are bent in another stage or pass after the eye hole and drain hole 66 and 68 respectively have been formed.

III. TABLE OPERATIONS

Figure 11:
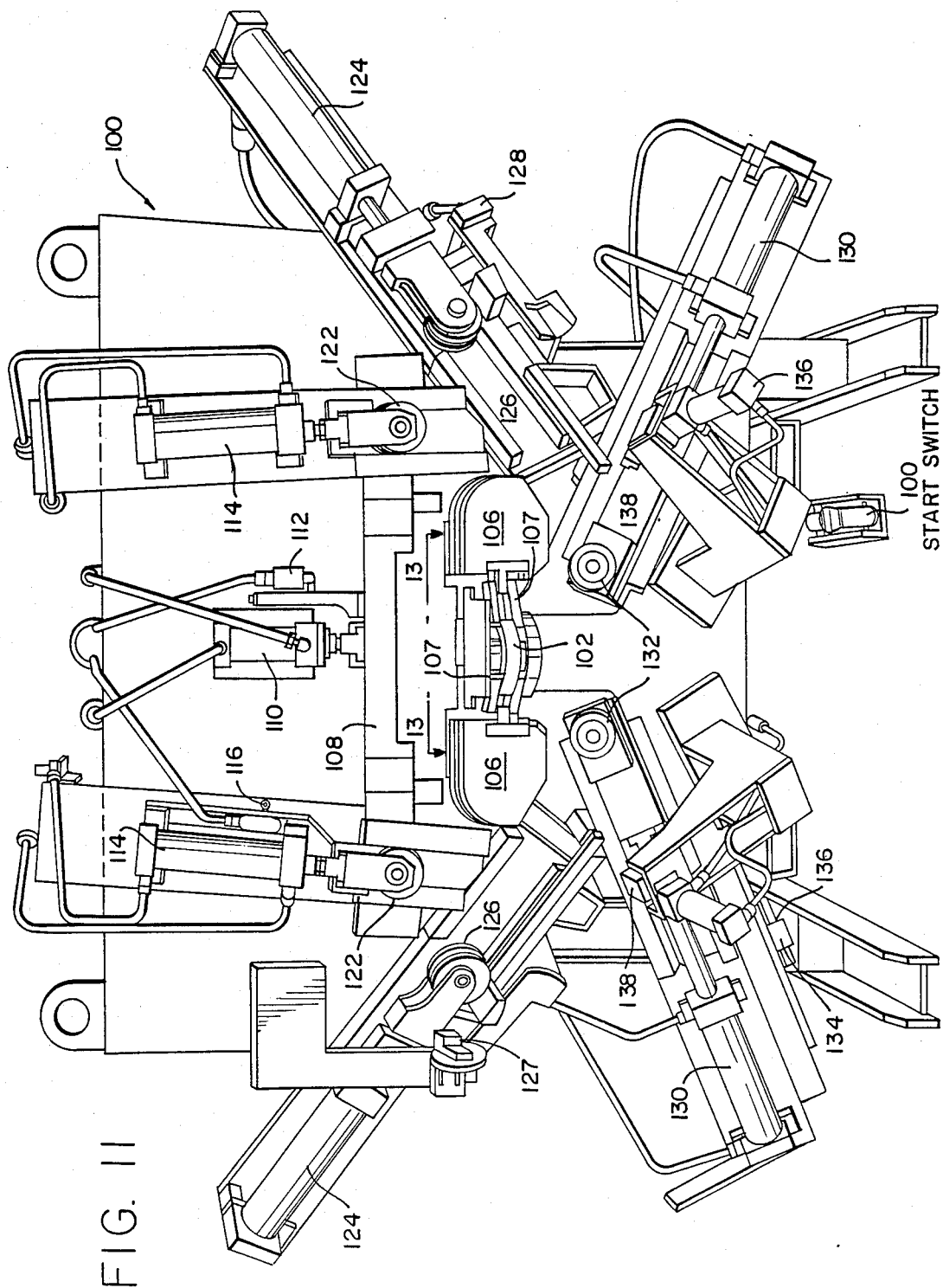
FIG. 11 is a pictorial front elevational view of the forming table.
Figure 12:
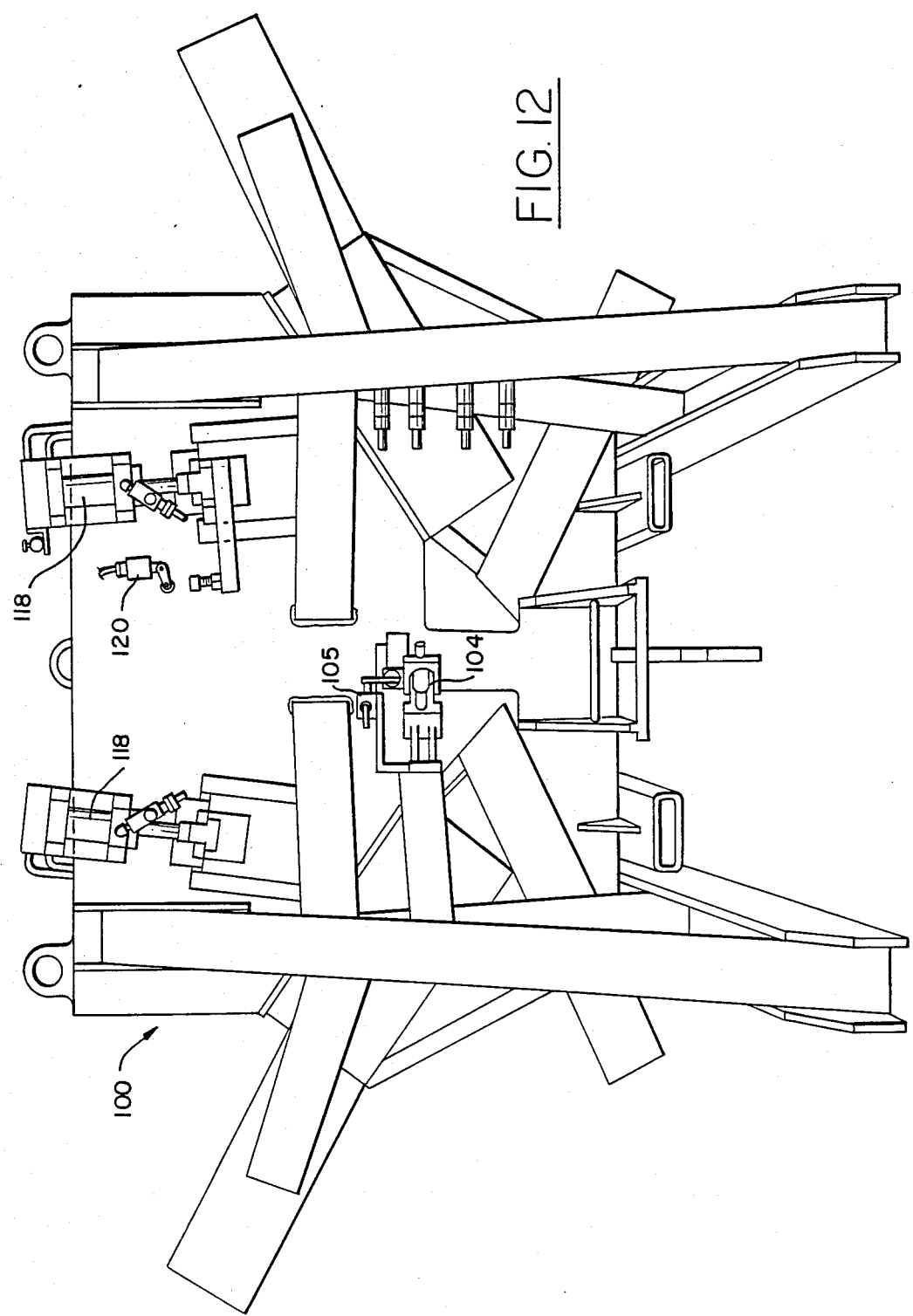
FIG. 12 is a pictorial rear elevational view of the forming table.

After the punching, piercing and chamfering operations carried out in FIGS. 4–10, 10A and 10B, as required by the customer, the next operation is bending on the forming table shown in FIGS. 11–23, inclusive, in order to create a double sigmoid shaped bar with flattened eyehole ends, an operation in which the workman takes the intermediate workpiece product from FIG. 10, heats it in a high heat furnace to a critical temperature of 870° C. to 910° C. for delivery to the forming table 100 as shown in FIG. 11, which essentially is constituted of steel plate about 1–2 inches in thickness, about 50 inches high and 80 inches wide mounted on a stand as shown in FIGS. 11 and 12. In FIGS. 11 and 12 the cylinders are inactive. Bending occurs in stages, first, to a bar formed as a trapezoid and then second, to the bar formed as a double sigmoid curve.

FIGS. 11 through 23 inclusive show various views of the forming table used by a single operator for the formation of a double sigmoid curved stabilizer bar in which the bars must be preheated along their entire length in a high heat furnace (not shown) to provide a flow of heated bars brought to a critical temperature of 870°–910° C. for delivery in a timed sequence controlled by the operator on the forming table.

In FIG. 11 a pictorial view is shown of the forming table 100 having a starting switch in the form of a foot switch 101 used by the operator to start the bending cycle. This takes place by the action of cylinders 114 cooperating with anvils 106 and cylinders to make a trapezoid shape and then by cylinders 130, these cylinders each having a limit switch 134 associated with each and each associated further with forming rollers. The rollers associated with cylinders 114 are the rollers 122 which create the bending in a timed sequence the first of the series of bends required.

Figure 15:
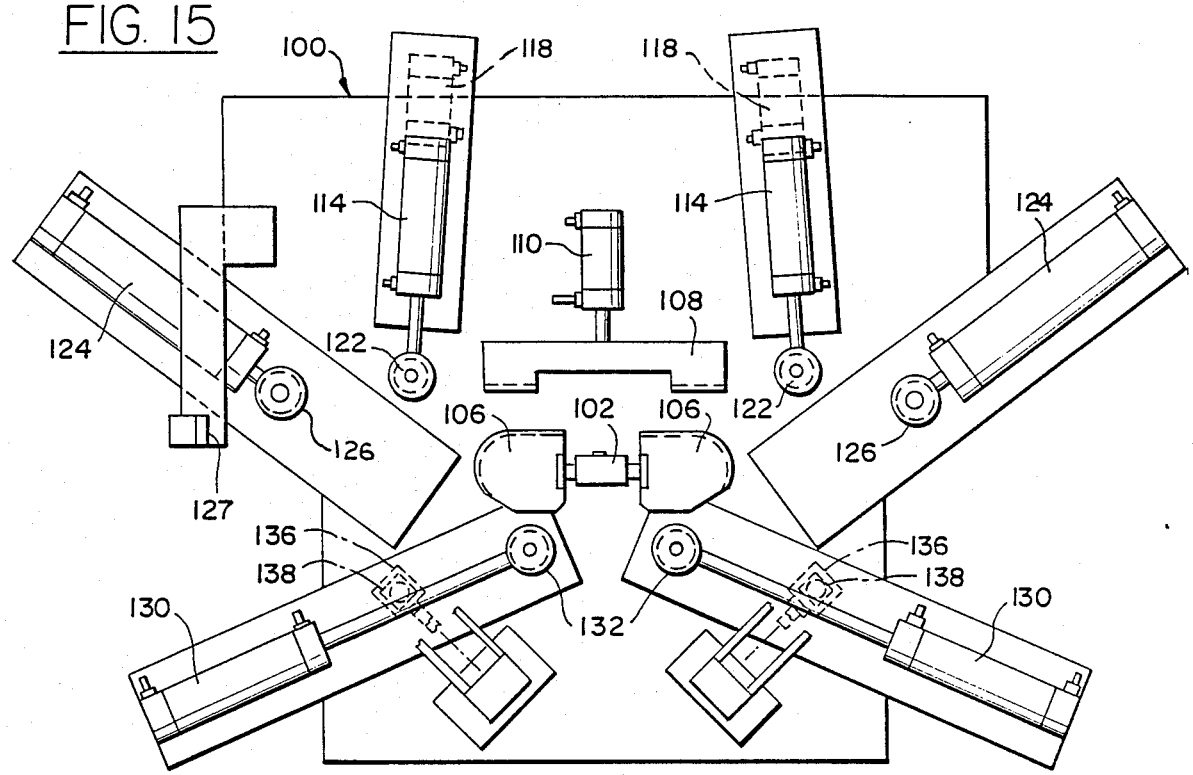
FIGS. 15-23 inclusive are diagrammatic views showing the various steps in sequence for forming a stabilizer bar.
Figure 16:
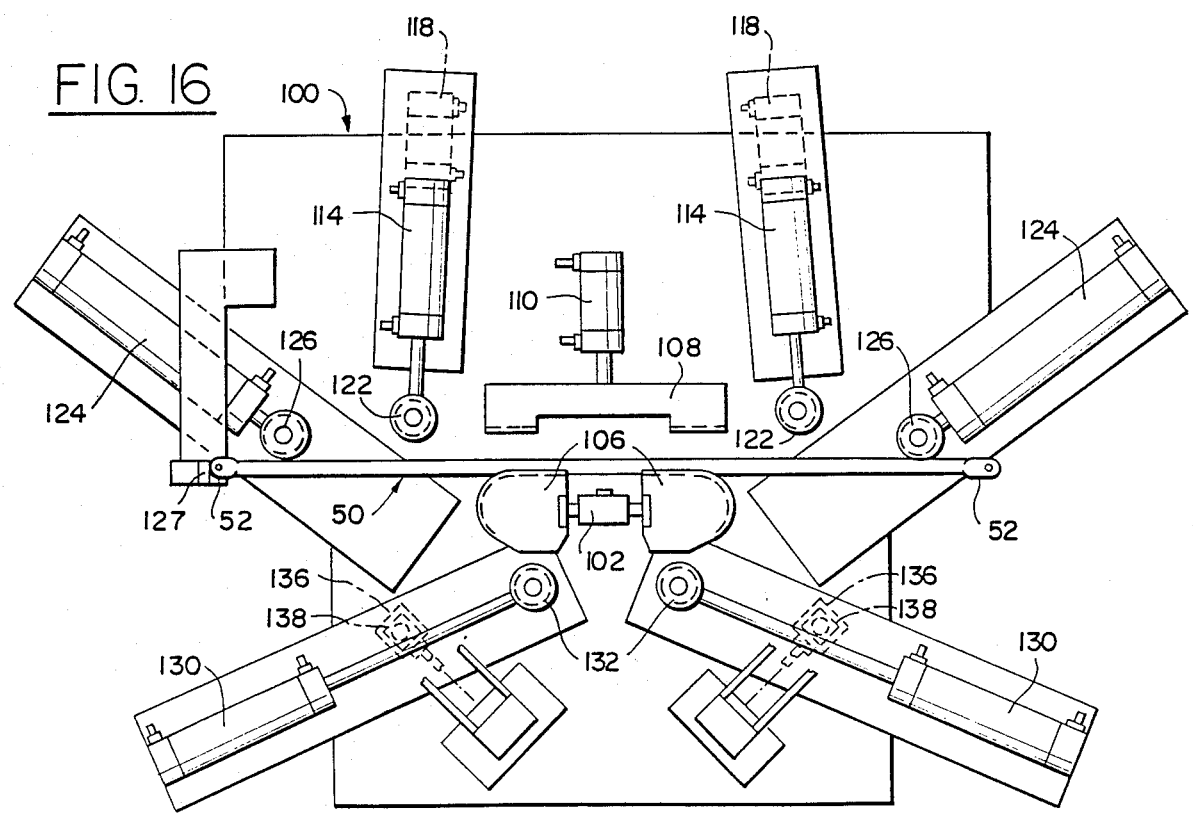
Figure 17:
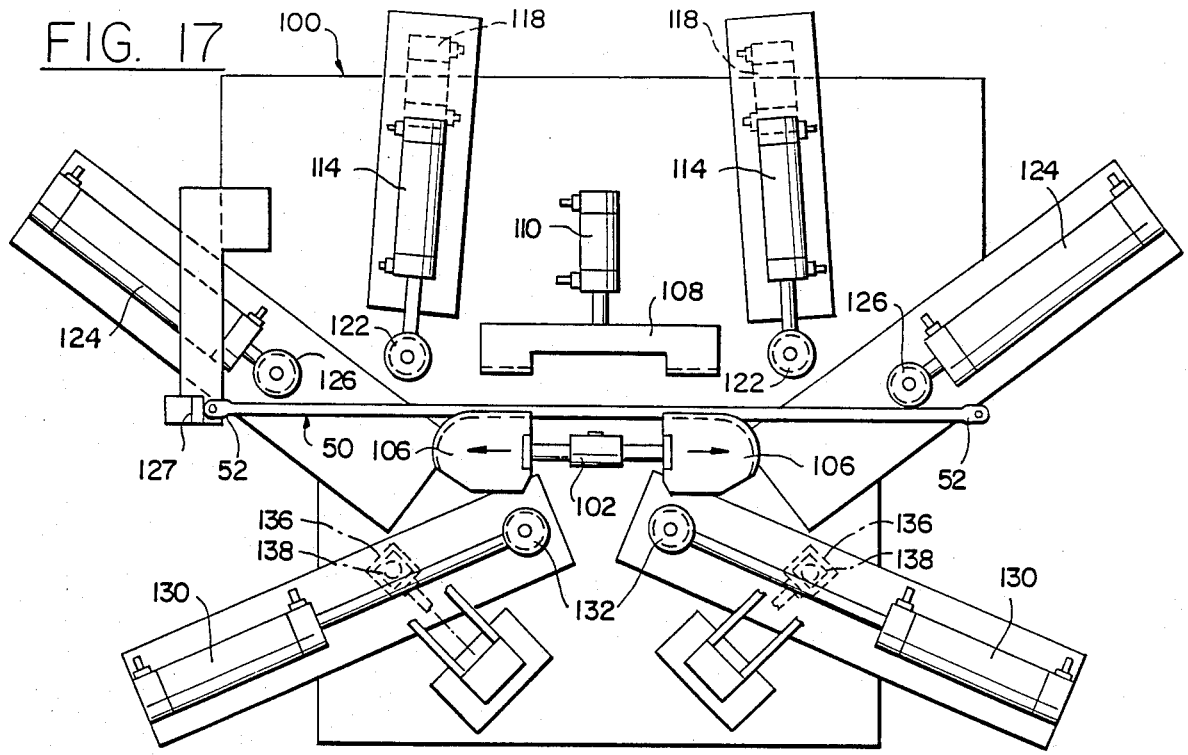

The tubular bar or workpiece 50 which is heated to 870°–910° C. as indicated above is shown in the stages of bending as illustrated in FIGS. 15 through 23 respectively. The hot tubular bar of FIG. 16 has its one end, the left end, held in the stop holder 127 and its center portion is pressed against anvils 106 at the center of the table. The anvils 106 at the center of the forming table are connected to each other by means of disc 102. The anvils are moved outwardly as shown in FIG. 17.

The step 1 bending operation to form the trapezoid starts in FIG. 15 which shows the table 100 ready to receive the hot bar 50 from the furnace.

FIG. 16 shows the end 52 positioned in the stop 127 for the initial length adjustment and angular orientation of the hot bar with anvils 106 in place to press the bar against the anvils which is step 2.

The next step is step 3 and is shown in FIG. 17 in which the anvils are extended in the spaced apart position.

Figure 18:
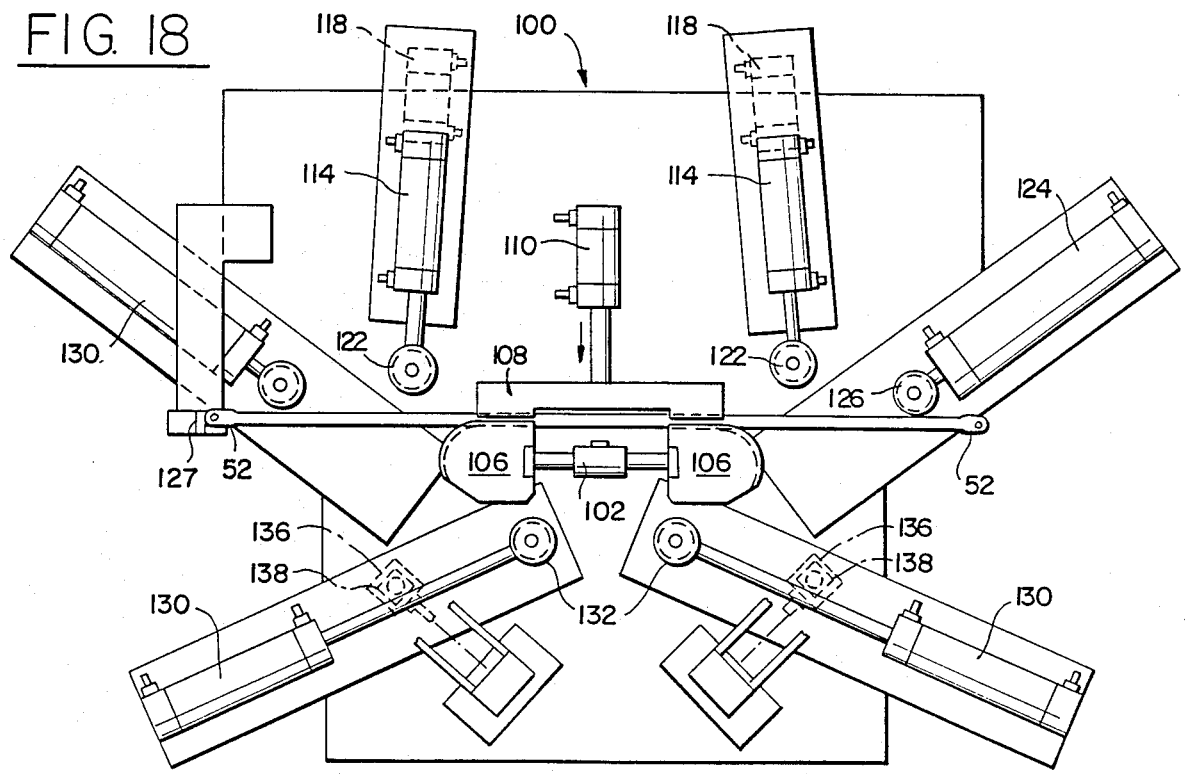

In FIG. 18 which is step 4, the clamping anvil 108 moves downwardly by hydraulic action imparted through cylinder 110 whereby the center portion of the hot bar 50 is held tightly against the top of the anvils 106. Note that in FIG. 18 the center of the bar is held by the clamping anvil and the ends are ready for the bending and curving to the double sigmoid.

Figure 19:
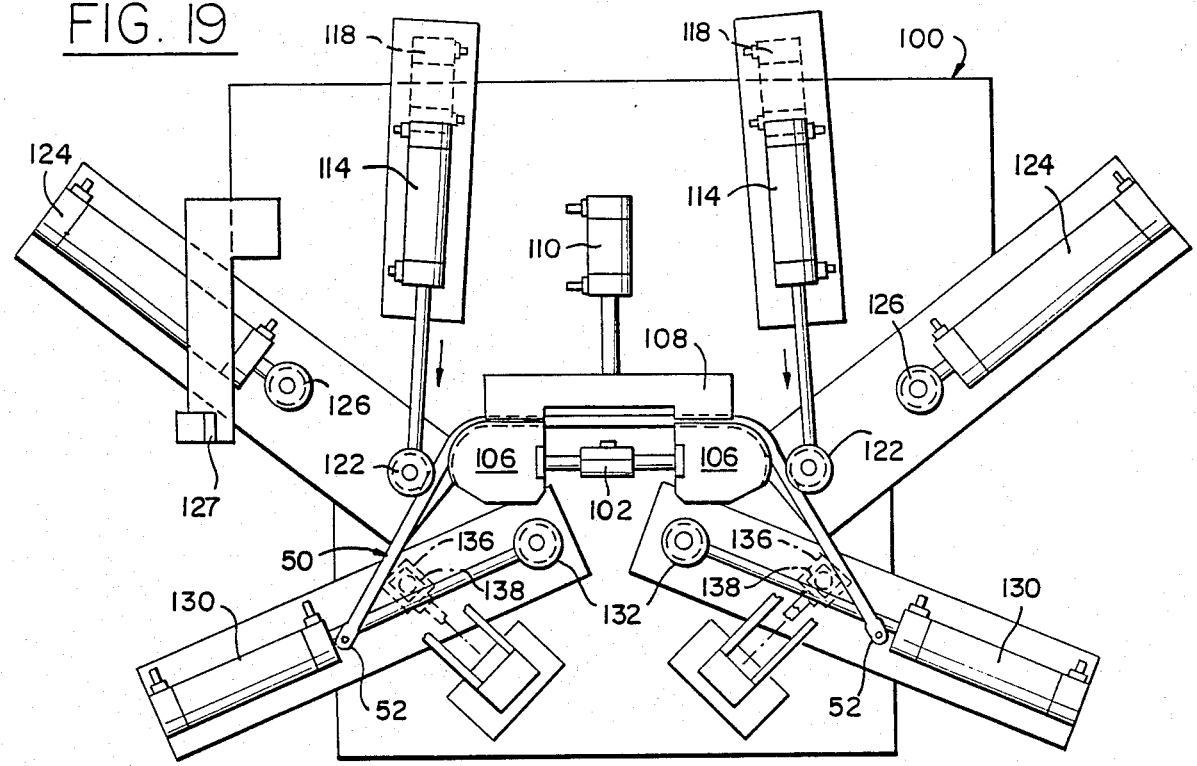

The starting of the double sigmoid curve is accomplished in step 5 which is shown in FIG. 19, wherein the trapezoidal sides are formed by the hydraulic action of cylinders 114 forcing the forming rollers 122 against the hot bar 50 which are pressed against anvils 106. Note that in FIG. 19, the rollers 122 are located above the arcuate outer surfaces of anvils 106 to press the hot bar 50 downwardly against the anvils 106 to leave the center portion of the hot bar 50 as the top portion of the trapezoid and the pressing action of rollers 122 creates a bending downward movement following the contour of the arcuate outer surfaces of the anvils 106.

Figure 20:
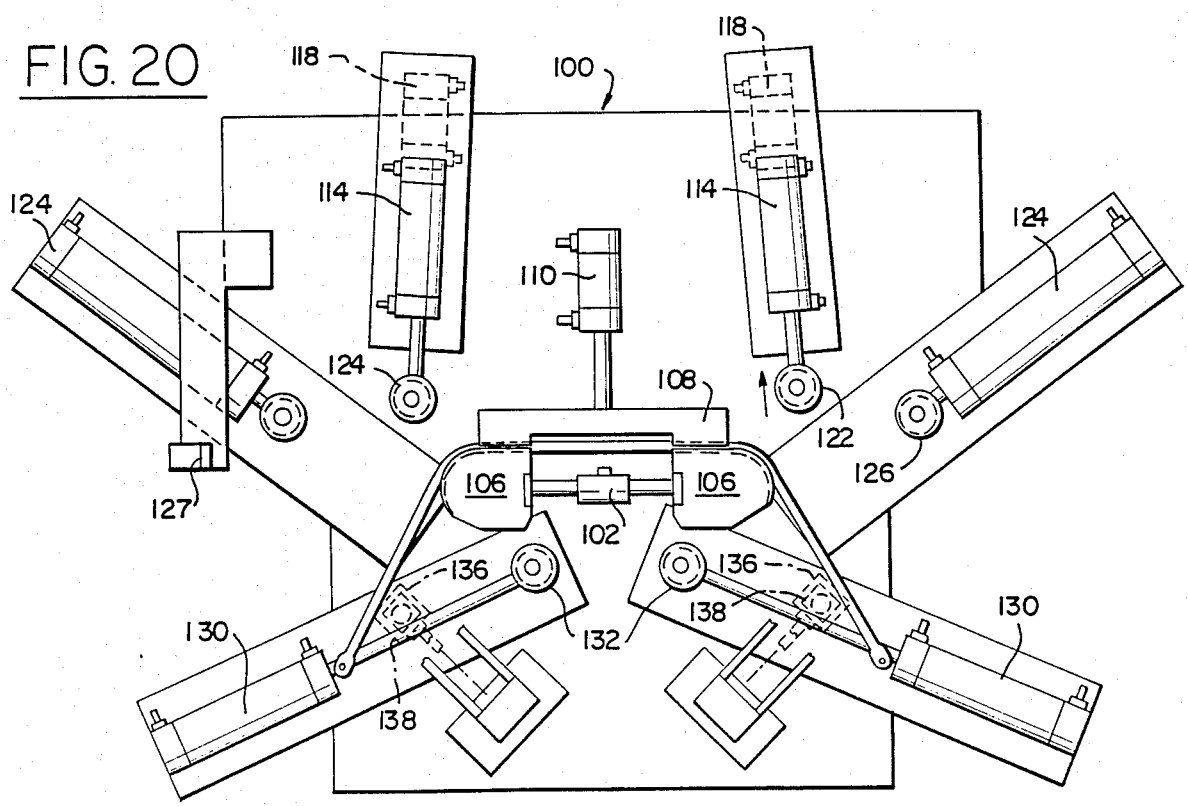
Figure 21:
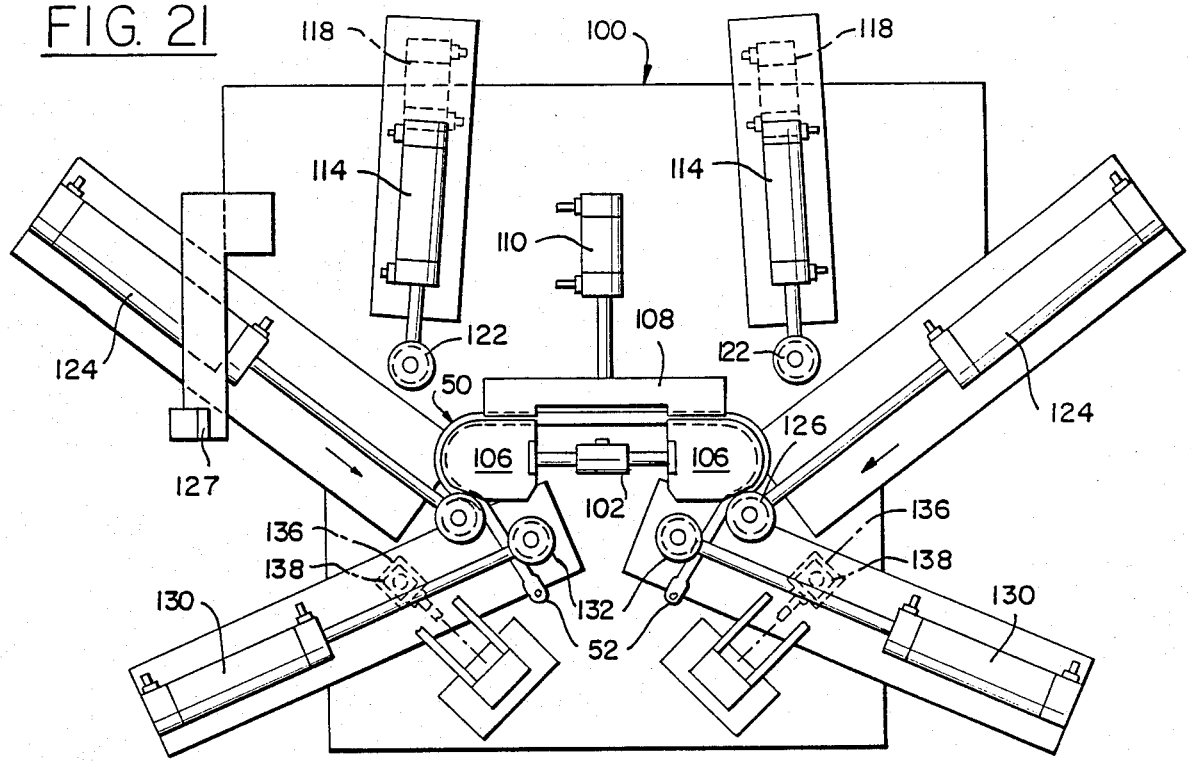
Figure 22:
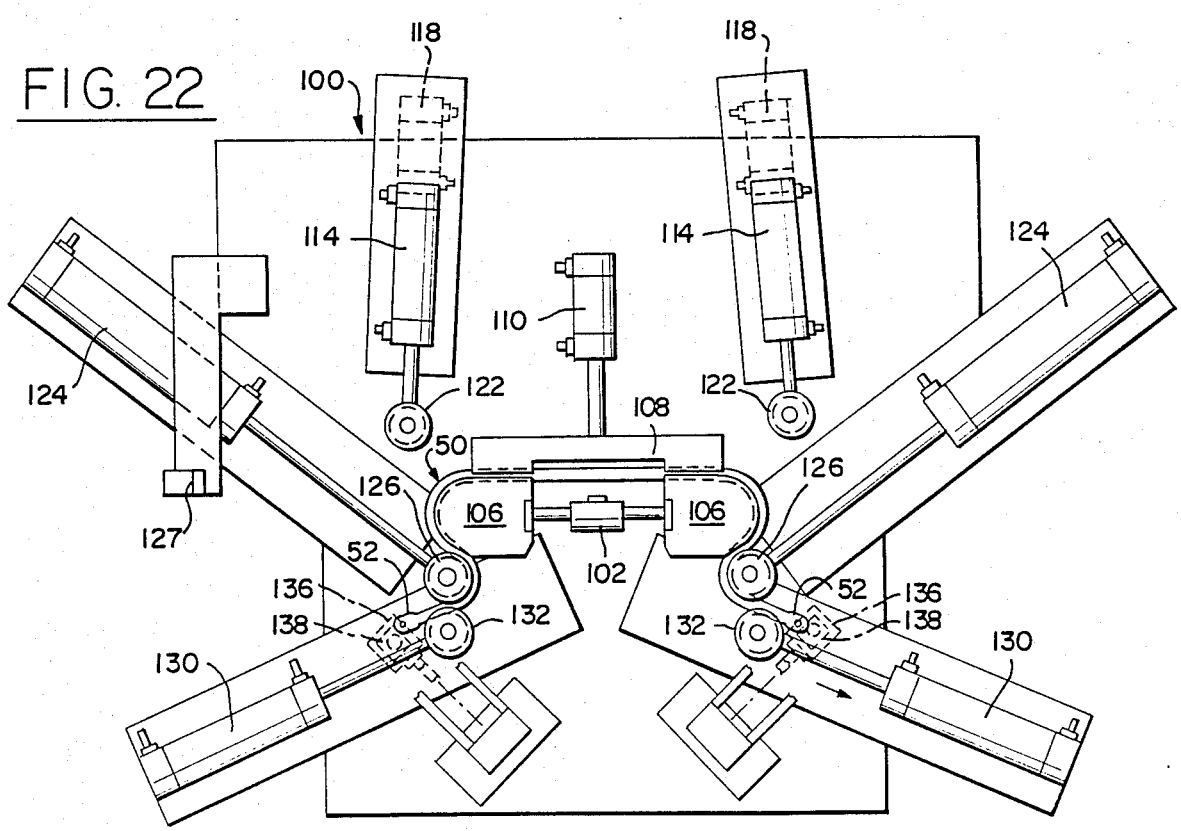

In the configuration shown in FIG. 20, step 6, the bar has a configuration of a trapezoid having slanted sides. Step 6 consists of retracting rollers 122, extending cylinders 124 and consequently rollers 126 without interference of the two. In FIG. 20 the end of the bending movement for the trapezoid form is shown. Step 7 is shown in FIG. 21 where the beginning movement of cylinder 130 and the end movement are shown for the sigmoid portions which is created by the forming rollers 132 hydraulically actuated from cylinders 130. These rollers work on the inner sides, left and right simultaneously, of the hot bar 50. The rollers 126 work against the lower arcuate surfaces of the anvils 106 in alignment with rollers 132 whereby these aforementioned rollers act in directions opposite to each other, gripping the bar to form the sigmoid bends at each side of the stabilizer bar. This formation of the two sigmoid bends at the left and right sides of the bar 50 is accomplished in step 8 and is best shown in FIG. 22. FIG. 22 shows that once cylinders 130 are fully extended, cylinders 136 extend to form the ends of the stabilizer bar in the correct orientation.

Figure 23:
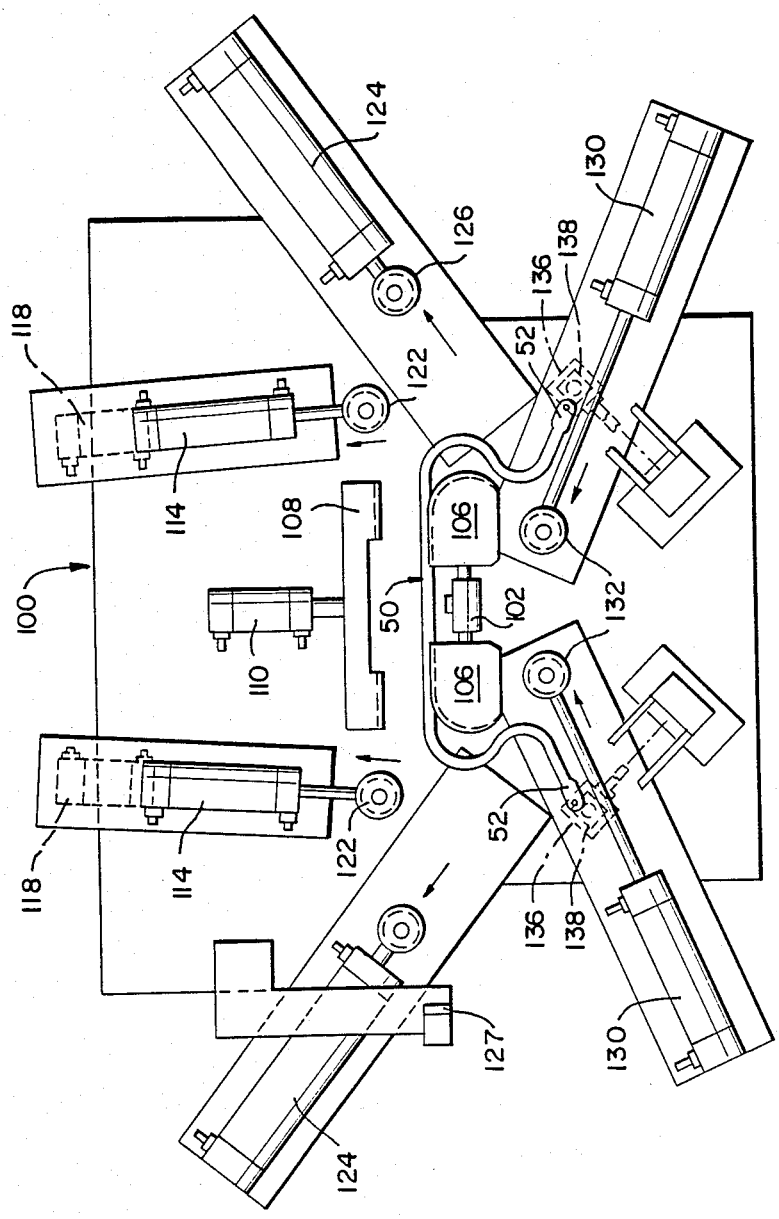

In FIG. 23, there is shown the cylinders returning to their respective starting position.

The cylinder 110 actuates limit switch 112 and cooperates with the anvils 106 as shown in FIGS. 11 and 15 to 23. In similar fashion limit switch 120 is actuated by cylinder 118 as shown in FIGS. 12 and 15 to 23. Also limit switch 128 is actuated by cylinder 124 as shown in FIGS. 11 and 15 to 23. As a result of the coaction of the anvils 106 and the cylinders, the blocks 138 on the ends of the piston rods of cylinder 136 press the ends of bar 50 as shown in FIGS. 11 and 15 to 23.

Figure 13:
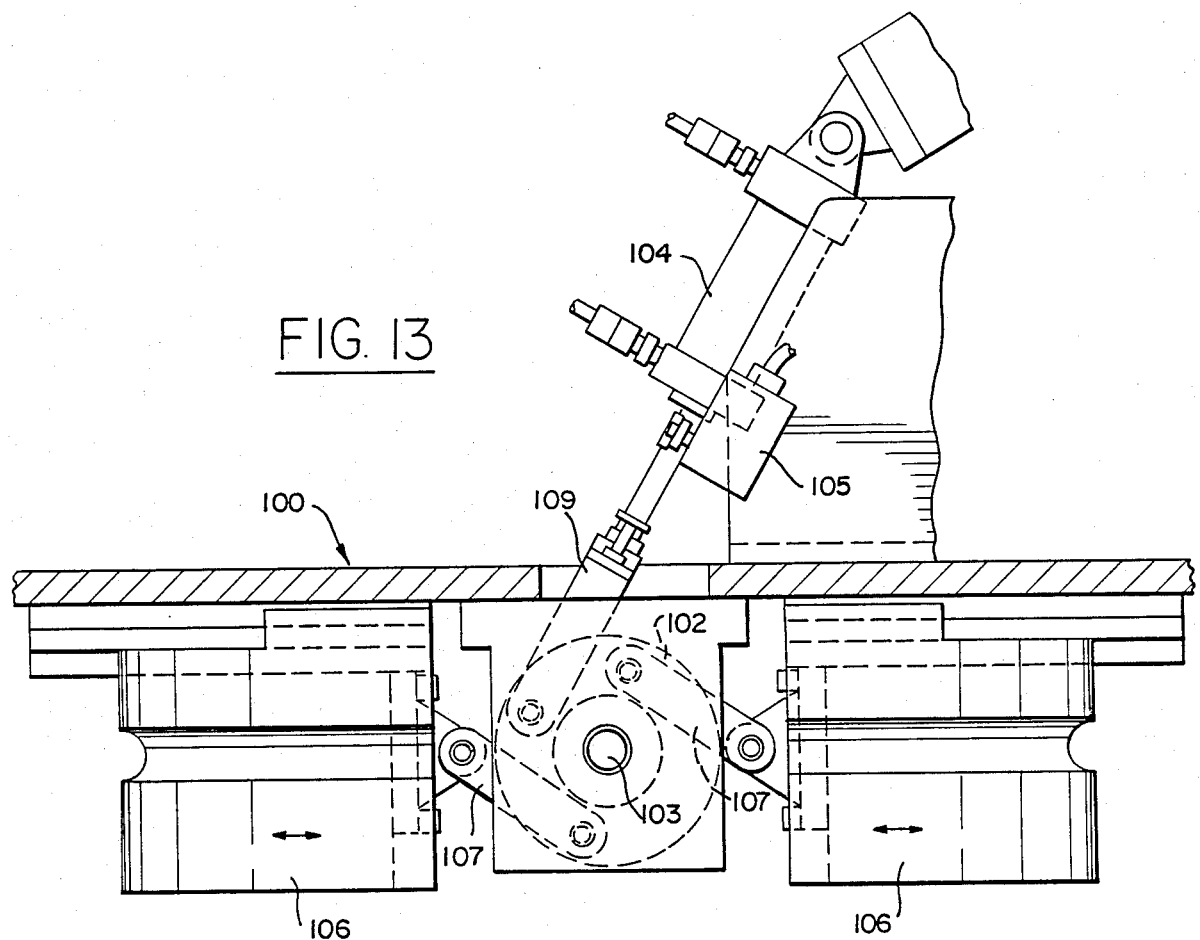
FIG. 13 is an enlarged fragmentary horizontal sectional view taken along line 13—13 of FIG. 11 showing the forming anvils in their retracted positions.
Figure 14:
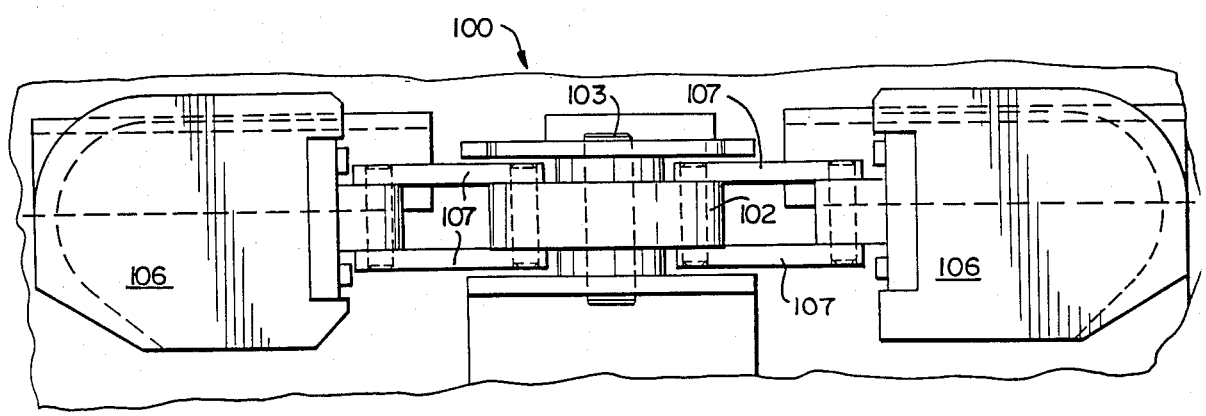
FIG. 14 is a fragmentary front view of the anvils showing their extended positions.

Note that in FIG. 17 the anvils 106 are extended in a spaced apart position as shown in FIG. 14. In FIGS. 13 and 16 the anvils are retracted.

The detailed construction of the anvils 106 is best understood from FIGS. 13 and 14 showing the anvils 106 in relation to the table 100 in the retracted position and in extended position respectively. As explained above the extended position of the anvils 106 corresponds to the showing in step 2, FIG. 17, while the initial position of the anvils as in FIG. 13 corresponds to step 1 shown in FIG. 15. Step 2 is initiated by the retraction of cylinder 104, which extends anvils 106 by means of the linkage 107 and the rotation of disc 102. Upon completed retraction of cylinder 104, the limit switch 105 is activated which will initiate step 3 or extension of cylinder 110.

As shown in FIGS. 13 and 14, shaft 103 comprises the axis of rotation of the disc 102 and permits the cooperation of the clevis 109 in the rotation of the disc 102 and clevis 109 further permits the complete retraction of the cylinder 104 to actuate the limit switch.

Figure 24:
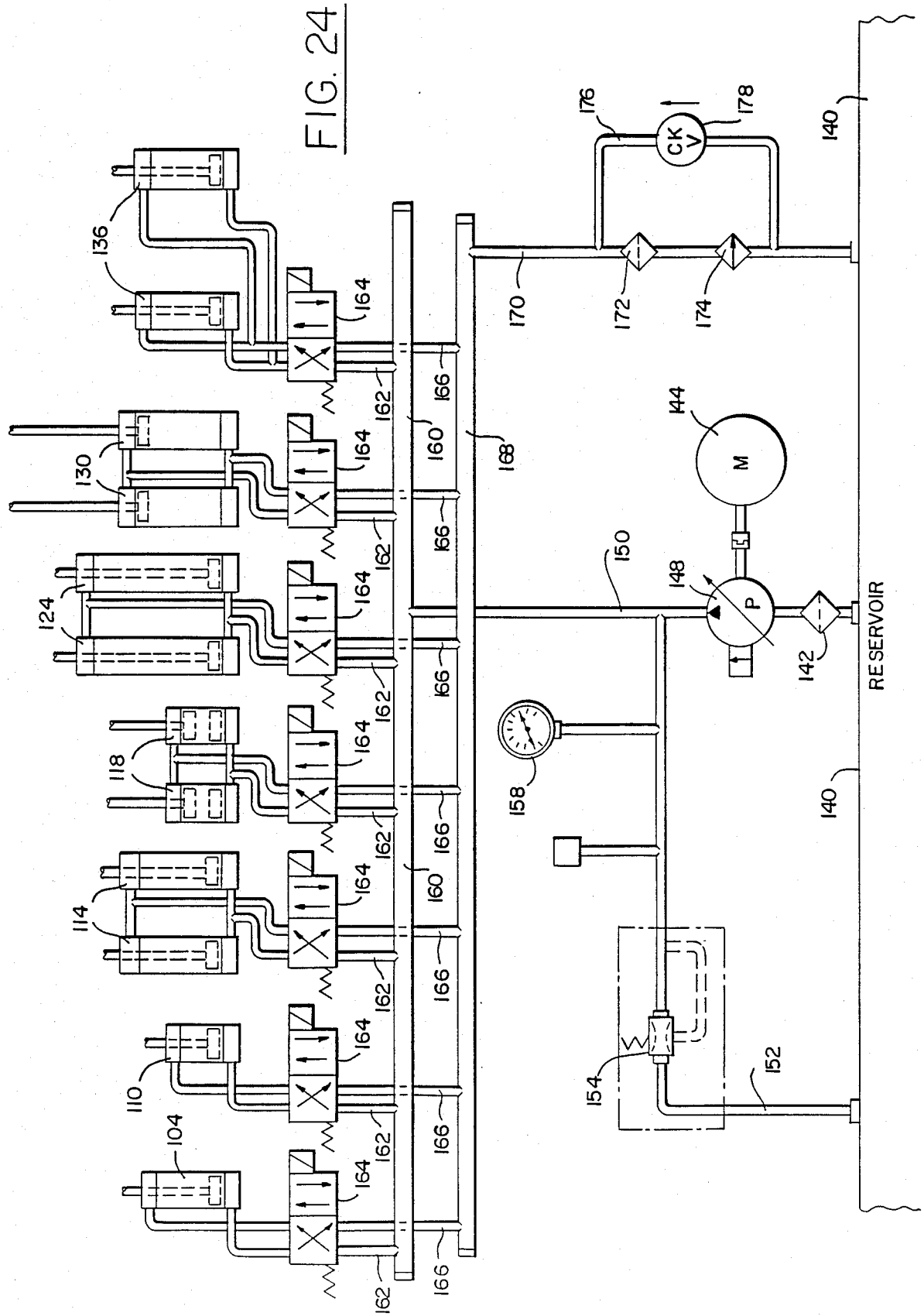
FIG. 24 is a diagrammatic view of the hydraulic circuit for the forming table.

The synchronization of the five pairs of forming and operating cylinders 114, 118, 124, 130 and 136, the cylinder 104 for operating the disc 102 in FIG. 13 and the clamping cylinder 110 for actuation of the clamping, can also be seen in FIG. 24 which shows the hydraulic circuit for the forming table 100. The cylinder 104 and the cylinder 110 are each single cylinders used in clamping the work and in the operation of the extension and retraction of the anvils 106 as shown in FIG. 14. As shown in FIGS. 15 and 16, cylinder 110 holds down clamp 108 to press hot workpiece 50 against anvils 106. The hydraulic circuit of FIG. 24 comprises reservoir 140 which supplies the hydraulic fluid for the system in which the hydraulic fluid such as oil, is filtered by means of a strainer 142, and is pumped under pressure. Motor 144 operates a pump 148 whereby the hydraulic fluid of the circuit is forced under pressure past a pressure gauge 158 and then feeds into the manifold 160 at the proper pressure to supply the five pairs of forming and operating cylinders 114, 118, 124, 130 and 136 and also the single disc operating cylinder 104 and the single clamping cylinder 110 for the anvil apparatus operated as shown in FIG. 13.

The disc operating cylinder 104 and clamp holding cylinder 110 specifically provide the retraction and expanding movements for the clamping of the hot bar 50 and placement of the bar as shown in FIGS. 13, 14 and 15 wherein the mechanical anvil operation, and the controls for clamping operations are shown. Based upon the electrical contact during retraction which occurs in the actuation of limit switch 105 in FIG. 14, there is provided a precise control of clamping which is synchronized with the pressure in the hydraulic system and with the synchronized forming steps. Obviously the holding, forming and releasing steps must be controlled by hydraulic pressure which varies with different stabilizer forming tables.

The hydraulic circuit of FIG. 24 also comprises, in the inlet portion, a bypass or shunt in the incoming manifold line 160 shown as conduit 152 and pressure relief valve 154 to assure that excessive pressure does not build up in the manifold 160 and that all cylinders will operate properly. The pressure gauge 158 and the pressure relief valve 154 are connected to the incoming conduit 150 feeding manifold 160 of the hydraulic circuit of FIG. 24.

Feed lines 162 connect each of the five pairs of operating and forming cylinders, cylinder 104 and cylinder 110 to manifold 160. A return manifold 168 is provided adjacent and generally parallel to the incoming manifold 160. The connecting return conduit 170 is shown in FIG. 24 at the lower right part of the Fig. Return lines 166 connect each of the cylinder pairs 114, 118, 124, 130, and 136 as well as disc operating cylinder 104 and clamp operating cylinder 110, to the return manifold 168. A return manifold 168 cooler system is provided comprising filter 172, oil cooler 174, bypass 176 and check valve 178 in this bypass. This return manifold cooler system returns the oil to reservoir 140. Effectively the incoming manifold 160 and return manifold 168 provide parallel lines for feeding, returning and cooling the oil. The infeeding provided from the common manifold 160 creates a direct connection via pipes 162 to the direct control valve 164 which is present in each of the five pairs of operating and forming cylinders. Direct control valves 164 not only control the cylinder operation by the inflow of the fluid, e.g. oil, into the cylinder through feeder line 162 but also control the flow of the fluid out of the cylinder through outflow line 166. In FIG. 24, the arrows which have their heads pointing in the upward direction in the valves 164 denote the flow of oil into the respective cylinder. The arrows with their heads pointing downward denote the flow of the oil out of the cylinder in each case. The crossed arrows signifies the valve function in this diagram, e.g. that valve 164 controls oil flow in both directions.

Synchronization of the sequence of valve operations which controls the synchronization of the mechanical movement of the respective five pairs of operating and forming cylinders can be seen by reviewing each of the eight steps shown in FIGS. 15-22 already described for each of the separate steps of the bending operation as illustrated in FIGS. 15 through 22 inclusive.

Briefly, the first sequence comprises steps 1–3, in which the hot bar 50 is received on the forming table 100 and is anchored in stop 127 to undergo a first series of steps of registering and clamping by utilizing the initial action of clamping cylinder 110. Cylinder 110 brings clamping bar 108 to bear against the center part of the hot bar 50 so that by the completion of step 3 the disc operating cylinder 102 has spread the anvils 106 apart as shown in FIG. 17. In the next step, the rollers 126 are actuated by cylinders 124 to press the ends of the hot workpiece 50 on both sides of the clamp 108 and of the anvil 106. The step 127 securely engages the one end, e.g. the left end of the hot workpiece 50 to provide holding at the end in registration.

In the next sequence of steps constituting the trapezoid bend, the operating and forming cylinders 114, come into play and provide the bending action by the pressing movement of rollers 122 on opposite sides of the clamping bar 108 whereby the hot workpiece retains its straight shape at the center to form the top of the trapezoid and the two sides of substantially equal length flanking the straight top are bent to form symmetrical sloping trapezoid sides. Concurrently rollers 122 and cylinders 114 push and bend the hot workpiece away from rollers 126. This second sequence is shown in steps 3, 4, 5 and 6 shown in FIGS. 18, 19, and 20 which starts with the extension of cylinder 114 once cylinder 124 is retracted. Roller 122 bends the workpiece 50 to conform with the shape of anvil 106. After complete extension of cylinder 114, cylinder 118 retracts to retract roller 122 and prepare for the next sequence of operation.

The third sequence of synchronization is shown in steps 7, and 8, FIGS. 21 and 22, in which rollers 126 push inwardly against trapezoidal sides of the hot workpiece 50 at both sides of the trapezoid, and thereafter rollers 132 are pulled against the bottom portion of the sides to form the double sigmoid shape of the hot workpiece 50. The last step is the extension of cylinder 136 and consequently the extension of anvil 138 to form the hot workpiece 52.

In FIGS. 24 through 27 the critical quenching and cooling steps are illustrated in the continuation of the table processing steps shown in FIG. 1 which takes place after the hot tubular workpiece 50 has been formed on the table 100. the tubular sigmoid bent bar from the forming table 100 was first heated at the ends prior to the forging operation at a temperature of 1150° C. up to 1240° C. and flattening of the ends without undue thickening occurred. Thereafter some trimming of the ends might be required. Before entering the forming table, the workpiece having flattened ends was brought up to critical temperatures of 870° C. to 910° C. for forming operations on the forming table and bending took place in three sequences, the first the clamping of the workpiece; the second sequence the trapezoid form and the third sequence the stage of double sigmoid curvature.

The quenching step which is the next step of this sequence of heating and table forming steps brings the temperature down to approximately 90° C. and the quenching step is followed by tempering for a critical time period of 45 to 50 minutes for the purpose of assuring the transformation of martensite into tempered martensite. the temperature for the transition from martensite to tempered martensite is from 470° C. to 535° C.

Figure 25:
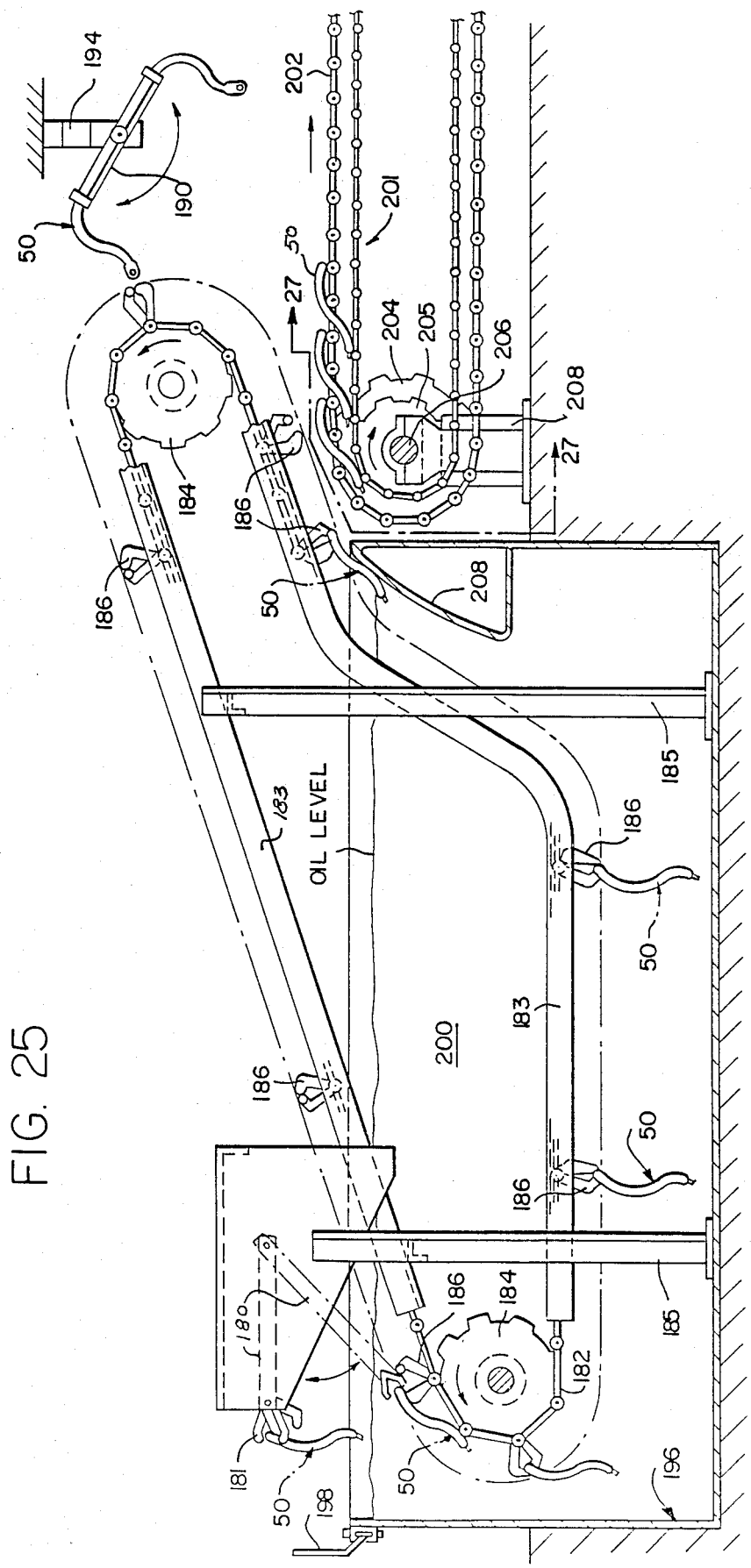
FIG. 25 is a fragmentary diagrammatic side elevational view, partly in section, of the quenching tank showing the pivoted arm for lowering the completely formed stabilizer bar into the quenching oil and also the arrangement for oscillating the completed bar to drain whatever quenching oil might have accumulated therein during the quenching process.

The workpiece 50 on the forming table 100 is at a temperature of about 760° C. down to about 700° C. when it enters quenching tank 196 in FIG. 25. The initial quenching operation guides the workpiece 50 in the pivot arm 180 into the quenching tank 196 of FIG. 25 in which the quenching oil level is automatically maintained at a predetermined level as shown at the legend. The workpiece 50 is moved from the forming table and first grasped by jaws 186 of the conveyor at the middle portion. The pivoted arm 180 cooperating with a jaw 181 to grasp the workpiece carries the formed hot bar to clamp 186, which is immersed in quenching oil. The jaw 181 on the pivot arm 180 then releases the bar and clamp 186 advances to totally immerse the bar in the quenching oil. The pivot arm 180 and clamp 186 are shown in FIG. 25.

Figure 26:
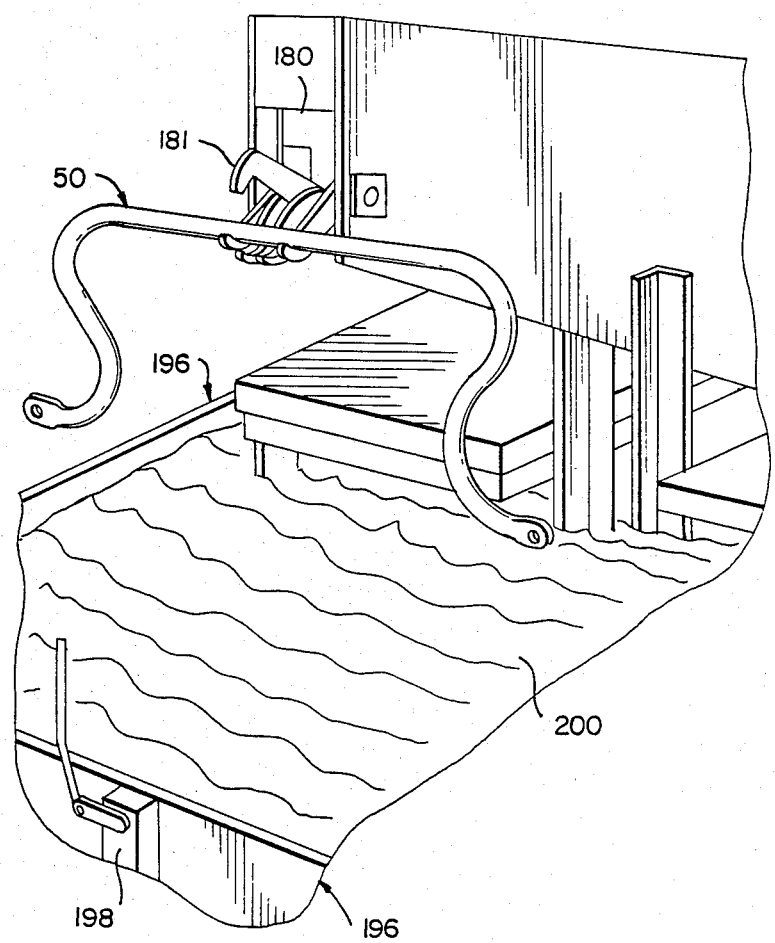
FIG. 26 is an enlarged fragmentary pictorial end view of the pivoting arm showing the arm in its raised position with its jaws opened to receive a stabilizer bar before it is immersed in the quenching oil.

The pivoted arm 180 which grasps the center of the workpiece 50 by means of the closing of the jaws 186 and the lateral movement of the pivot arm is shown by the arrow in FIG. 25. The cradle 190 which is shown at the right side of FIG. 25 shows the apparatus used to drain the oil from the workpiece 50 which is operated by an operator. The jaw action of the jaws 186 and the pivoted arm 180 cooperates with the jaws in grasping the workpiece is also shown in FIG. 26 which further illustrates how the oil level is maintained.

In the view shown in FIG. 25 a limit switch 198 serves to actuate the quench cycle through the quench tank 196. During the traverse of the hot workpiece in the quench tank the oil quickly brings the workpiece temperature down to less than 90° C., e.g. in approximately 4 minutes.

FIG. 25 also shows a diagrammatic side wide of the conveyor for supporting the bar 50 through the quenching tank 196. A conveyor chain 182 is guided through the quenching tank by a track 183. The chain 182 is actuated by the sprockets 184 (the drive motor not shown). The conveyor is supported in the quench tank by supports 185.

The exit end of the quench tank has a deflection plate 188 to position the bar 50 for its delivery onto the tempering furnace conveyor 201. The furnace conveyor 201 has an outer link chain 202 and belt conveyor chain 203 mounted on sprockets 204 and 205 respectively, assembled on the common shaft 206 and supports 208.

The cooled workpiece 50 which emerges form the quenching tank 196 is oscillated by the oscillating mechanism provided at the fulcrum of the cradle 190 and oscillation is shown in the direction of the arrows which are directed to and fro at the right side of FIG. 25. In the oscillation or the workpiece 50, the oil which has collected as a meniscus at the drain hole 68 is shaken away.

The cooled workpiece is then subjected to a tempering furnace for tempering and phase change which brings the temperature of the workpiece 50 up to a temperature range of 470° C.–535° C. to thereby carry out the tempering step by maintaining this tempering temperature range for a period of 45–50 minutes and the transformation occurs from the martensitic phase to the tempered martensitic phase. The workpiece 50 is water spray cooled after the draw furnace operation to enable the operators to handle the bars.

At this point the bar is inspected and tested. Workpiece hardness tests are conducted approximately once an hour to ensure the hardness is obtained. The workpiece dimensions are checked by placing each stabilizer bar in a checking fixture. All bars that do not meet the dimension requirements or hardness tests are rejected and separated. The tempering process is recorded on a strip chart recorder which indicates furnace temperatures. These records are kept and dated for follow-up by quality control should a check on a lot of workpieces be required. The process date and lot number may be inscribed on each workpiece if desired.

If the bars after cooling require additional treatment to withstand stress corrosion cracking or mechanical cleaning, peening in a peening machine (not shown) can be carried out. Where this operation is required the bars which require peening can be handled in a separate line where carousels for feeding the peening machine can be loaded and unloaded by hand and the parts stacked onto wooden pallets.

In FIGS. 28 through 32 show special operations for improving the strength of the ends of the finished bar which are carried out to significantly increase the thickness of the end of the tubular workpiece 222 by inserting a liner 228 at each end. The machine 220 for inserting the liner shown in FIGS. 28–30 is one which comprises hydraulic cylinders 236 anchored at opposite ends of the machine support and which drives push rods 238 so that the push rod heads 240 engage the ends of the insert liners 228 which are contained in cassettes 230 whereby the push rod heads 240 press against the chamfered inner diameter of the liner to slide the insert liner 228 into the end of the tubular workpiece 222 with an inset of liner in the workpiece. The illustration in FIG. 30 shows the insert liner 228 in its inserted position within the workpiece 222. Note that the dimensions shown in FIG. 30 are substantially the same dimensions as that of the actual tubular stock and that of the mechanism 220 for inserting the reinforcing liner.

Detent rods 226 at each end of the workpiece 222 drop through the clamps 224 to indent the outer and inner diameters of the workpiece 222 on the upper surface only and in making this indentation the detent rods 226 also indent the liner 228. The indentation in the tubular workpiece 222 constitutes about 1/8 of an inch at most but is sufficient to hold the reinforcing liner 228 into its registered position as shown in FIG. 30 wherein the liner is insert by a distance of about 1/32 of an inch in the position of this end as forced by pushrod head 240. In the showing in FIG. 30, the scale is about 1 to 1 and the indentation and inset in the Fig. represent the same dimensions in the machine and workpiece.

The mechanism 220 for inserting the liner is adapted for automatic operation by virtue of the fact that the cassette 230 as shown in FIGS. 28 and 29 contains a plurality of liners each of which is adapted when positioned to the lower location in the cassette to be pushed by the push rods 238 in the proper registered position.

The remaining operations which are carried out are flattening operations for the ends as shown in FIG. 31 wherein the ends having detent 227 is inserted into forging dies 244 so that each end is flattened and the piercing operation carried out in FIG. 32 in which a punching operation is carried out in piercing dies 250 having punch 252 provide a circular opening 248 of the workpiece as shown in the product view of workpiece 222, FIG. 33. The end view of FIG. 34 reflects the thickening which is created by the addition of the reinforcing liner 228. The opening 248 created by the punch 252 is achieved in a much thicker wall end structure in flattened end 246 than is the case where the liner is omitted from the workpiece as shown by end 52 in FIG. 9.

In contrast to the wall thickness of the tubular workpiece 50 and the thickness at its flattened end 52, with drain hole 68 therein shown in FIGS. 5, 6 and 7, the tubular workpiece 222 in FIG. 28 has a very substantial increase in the cross-sectional area of the tubular wall with insert 228 as compared with the cross-sectional area of tubular wall without the insert which is representative of the workpiece 50. This change in cross-sectional area for a tube 222 having an outer diameter of 1.024 inches and a width of 0.157 inch providing a total area of 0.4276 square inch is an increase of about 51% by inserting a liner of 0.709 inch in diameter and 0.118 inch in width to give a total of an additional 0.2191 square inch in area, these being approximately the dimensions shown in FIG. 30.

The additional wall thickness of the insert of 0.118 inch in tubular workpiece 222 of 0.157 inch wall thickness having insert 228 therein, is the sum of these two, namely 0.275 inch and the increase in cross-sectional area is the sum of 0.4276 square inch for tube 222 and 0.2191 square inch for the liner 228 to give a total of 0.6467 square inch. This increase, as pointed above, amounts to a 51% increase of the wall thickness of tubular workpiece 222 due only to insertion of liner 228.

As a result of the 51% increase in thickness, there also is achieve significant thickening at the flattened end shown in FIG. 34, where the attained thickness after flattening in die 244 results in a thickness of 0.350 inch and a width of 1.750 inch. No trimming of this width is needed. Also, no drain hole is needed. the compression at the eyehole 248 is sufficient and in the preferred insert thickened embodiment of FIGS. 32, 33 and 34 the eyehole width of 1.750 inches meets the required specification for heavy duty ends.

Turning now to a third species of stabilizer bar, there is illustrated in FIGS. 35–40 the manufacturing steps and apparatus for the cold swaging and hot forging operations carried out on tubular workpiece 260 resulting in a greater wall thickness than tubular workpiece 50 in FIG. 7. The third species of tubular workpiece 260 because of its substantially greater diameter, which is uniform throughout its length before the swaging step, requires a cold swaging operation to thicken the ends before the forging and end flattening operations are carried out.

Figure 35:
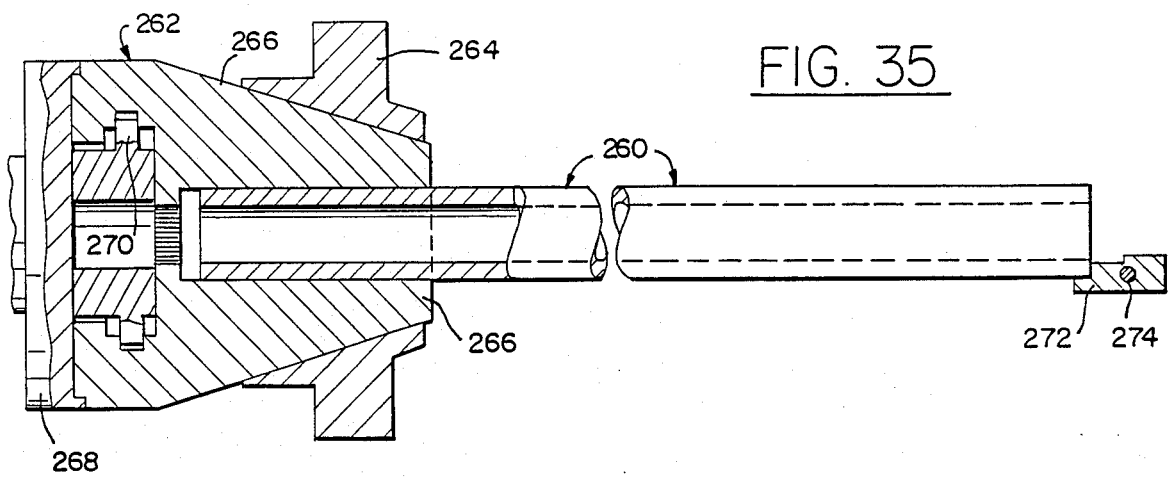
FIG. 35 is a fragmentary vertical elevational view partly in section showing a device for swaging the end of a tubular workpiece with the opposite end being shown aligned in a stepped pivoted back stop.
Figure 36:
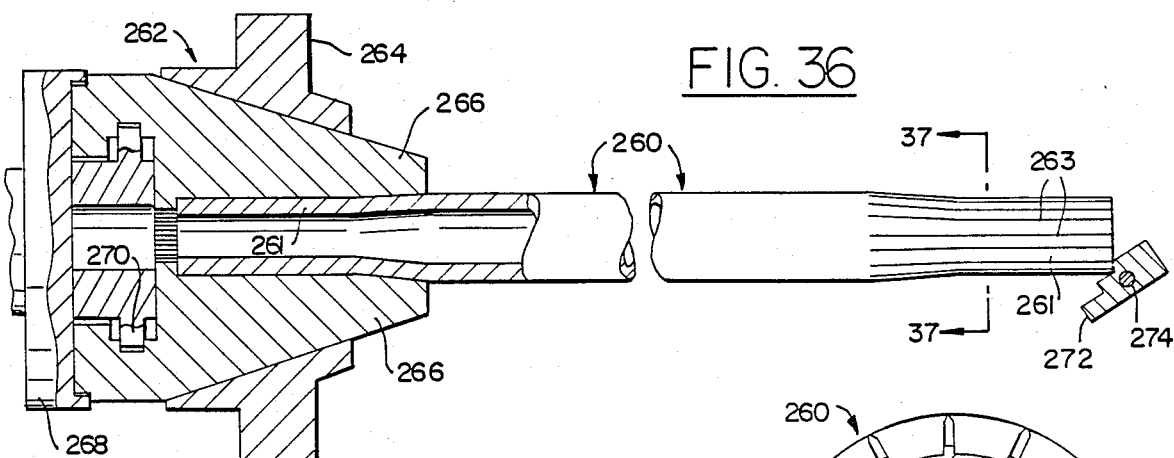
FIG. 36 is a view similar to FIG. 35 but showing the swaging reducing ring advanced on the reducing jaw segments to stretch and compress the end wall area of the tubular workpiece.
Figure 38:
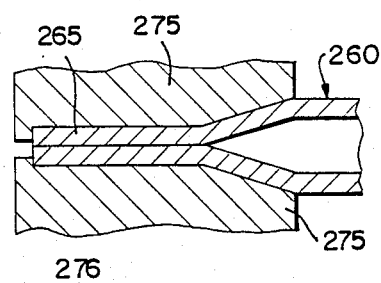
FIG. 38 is a fragmentary vertical sectional view showing the dies for flattening the swaged end of the tubular workpiece.

The swaging machine which is utilized for cold working and diameter reducing operations illustrated in FIGS. 35 and 36 is of conventional construction and comprises a swaging head 262 with the reducing jaw segments 266 having an opening for admitting the end of the tubular workpiece 260 so that the reducing jaw segments 266 grip and pull the end of the tubular workpiece 260 that enters the swaging machine.

Figure 37:
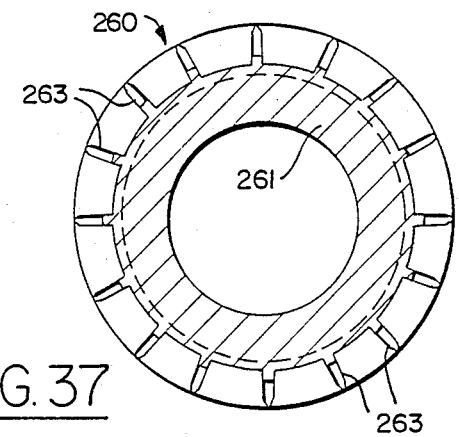
FIG. 37 is an enlarged transverse sectional view of the tubular workpiece taken along the line 37—37 of FIG. 36.

In the cross-sectional view of FIG. 37 the result after swaging at one end is shown. The longitudinal outer surface at the end portion of the tubular workpiece 260 is effectively lengthened while being simultaneously reduced in its swaged cross-section to form a conical intermediate zone and a straight end zone. The showing of the conical intermediate zone which appears at the right side of the workpiece 260 in FIG. 36 illustrates the one completed end. The right side of swaged end 261 is reduced and the entire swaged surface is formed with ribs 263 uniformly spaced around the periphery of this swaged end 261. The workpiece 260 is stretched and the end 261 has its length increased by about 4 to 6% of the total original length of workpiece 260 due to the operation of the swaging machine. The characteristic ribbed appearance in this stage of the swaged end 261 shown at the right side of FIG. 36 and in cross-section in FIG. 37 illustrates not only the stretching action which takes place during the long length reducing operation, but also the ridges which are formed by the squeezing of the ferrous material between the finger joints of the swaging machine. Also note the characteristic conical inward taper which is effectively formed within the swaging head 262.

Reducing ring 264 of the swaging machine serves to provide the desired reduction in diameter and the taper within the jaws 262 cooperates with swaging head 262 in forming the conical portion of swaged end 261 as shown in FIG. 36. The swaging of the tubular workpiece 260 is carried out at both ends so that the thickness of the tubular workpiece after swaging is significantly increased as shown in the cross-sectional view of FIG. 37. The swaged end thickened is substantially greater than in the non-swaged portions between the swaged ends of the workpiece 260 and the increase in thickness is between 16% to 40% of the workpiece thickness.

In order to insure the proper securing for the free end of workpiece 260, a back stop is provided opposite the end which enters the jaw segments 266. Backstop 272 is provided which has stepped portions, a first lower stepped portion to engage the non-swaged end of the workpiece 260 and a second upper portion to engage a swaged end. Pivot pin 274 of the back stop permits the two positions to engage the workpiece 260. The stepped lower construction is the one position which is used at the start before either end has been swaged and the second upper position represented by the upper step is used after one end has been swaged. The upper step serves to hold the lower edge of the cold work end 263 wherein the diameter has already been reduced by the swaging action. In the fitting of this backstop 272 at the upper step surface thereof the backstop is pivoted about pivot 274 as shown in FIG. 37 and effectively holds the work in a proper locking position for swaging the other end.

The appearance of the swaged ends 261 at both ends of the workpiece 260 after the swaging operation is characterized by the ridges, about 16 to 18 in number, which extend along a significant end portion of the workpiece and the increase in wall thickness is about 16% to 40% as a result of the swaging before flattening the ends.

The flattening step requires the heating of the swaged workpiece in order that the ends be flattened Without undue thinning or requiring trimming. For this purpose the heating apparatus shown in FIG. 4 is used to bring the temperature of the workpiece to the proper temperature range of 1150° C.–1240° C. Each end is sequentially placed in the flattening dies 275 of FIG. 38 and thereafter sequentially pierced in the punching dies shown in FIG. 39.

Figure 39:
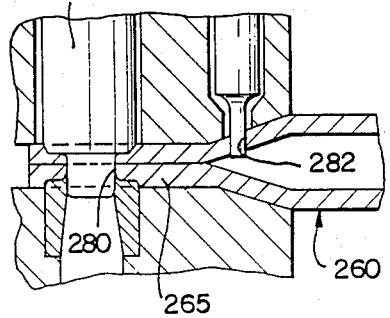
FIG. 39 is a fragmentary vertical sectional view showing a device for punching an opening through the flattened end and piercing a drain hole in one wall of the tubular workpiece.
Figure 40:
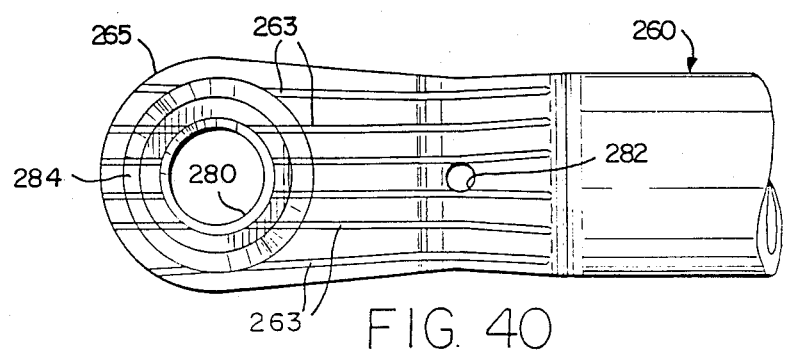
FIG. 40 is an enlarged fragmentary plan view of a competed end of the tubular workpiece.

The workpiece 260 thereby provides flattened end 265 as shown in FIG. 40 and the punching operation carried out in FIG. 39 by punch 276 provides opening 280, the eye hole opening, which s shown in FIG. 40. At the same time that the eye hole opening 280 is punched by the apparatus of FIG. 39, a piercing punch 278 forms the drain hole 282 at a location within the conical wall portion. The finished eye hole 280 is countersunk at 284 to provide an edge adapted for fastening by means of bolts to the frame of a car. After the formation of the eye hole 280 and drain hole 282 in the swaged end 261, the stabilizer bar 260 is still hot and is cooled before the heating and table forming operation to impart the desired curvature.

The table forming operations are carried out on a forming table and require as a necessary preliminary step, heating the workpiece 260 to a temperature of 870° C. to 910° C. so that the desired curved stabilizer bar can readily be formed.

Figure 27:
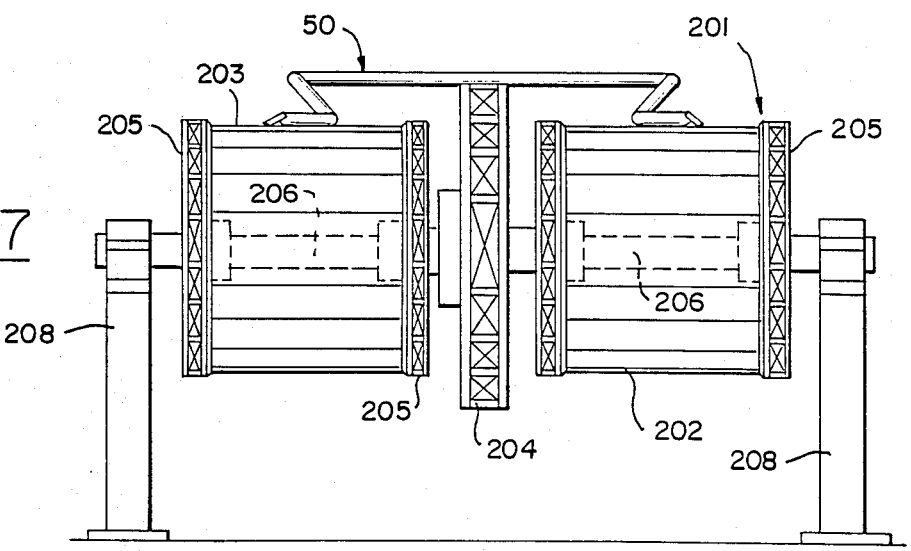
FIG. 27 is a transverse vertical sectional view through the tempering furnace conveyor taken on the line 27—27 of FIG. 25.

After the stabilizer bar is formed the curved workpiece 260 is quenched in oil in the apparatus shown in FIGS. 25–27. Following the oil quenching step the formed bar is then oscillated to remove the oil that has collected in the drain hole 282 and is subjected to a draw tempering step by heat soaking at 470° C. to 535° C. for 45–50 minutes. After the draw tempering is completed the martensite phase of the steel composition is transformed to tempered martensite.

As can be seen from the foregoing description of the Forging of Tube Ends and of FIGS. 2–10 that the stabilizer bar with novel end constructions is realized by hot forging of tubular stock material of predetermined length having uniform thickness throughout its length and prescribed inside and outside diameters, the novelty being characterized by the double sigmoid curvature immediately adjacent each end portion to function as a spring and the flattened end being pierced to form an eye hole. The sigmoid portion absorbs unbalance d stresses at either end. Since the steel composition of the bar is high strength low carbon steel, and the formed bar is heat soaked to convert the austenite phase into martensite the tempered product made by heat soaking exhibits improved hardness, toughness and fatigue resistance.

In certain thickness embodiments disclosed, the bar is additionally pierced adjacent the eye hole but within the conical tubular portion adjacent the flattened end to form a drain hole and thereby aid in eliminating oil from the interior after quenching in oil.

In end thickened embodiments as disclosed, a tubular insert having the same outer diameter as the inner diameter of the tubular stock material is inserted to thicken the end before it is flattened and the tubular insert is about 1/15 to ⅛ the length of the work piece.

Certain end thickened embodiments are swaged prior to pressing and forming the punched out eye hole areas.

It is preferred that the flattened end be formed in a width which is the dimension for width required for the finished bar thereby avoiding trimming. In such embodiments the thickness at the ends is about 55%–60% greater than in the center portion.

Having thus disclosed the invention, what is claimed is:

1. A method of bending and forming heated tubular workpieces having a straight central portion and double sigmoid curved opposed end portions, including:
   heating an elongated tubular workpiece and clamping the heated workpiece at its midsection between a pair of central anvil elements;
   longitudinally extending opposed ends of one of said anvil elements having first sigmoid curvatures along the length of the clamped workpiece;
   first bending the workpiece over the ends of the one anvil element forming a generally trapezoidal shape between the workpiece center and its distal ends;
   second bending the ends of the firstly bent workpiece completely around the first sigmoid curvatures of the ends of the one anvil element forming the ends into first sigmoid curves conforming to the sigmoid curvatures of the ends of the one anvil element; and
   third bending the distal end areas of the workpiece into reverse, second sigmoid curves.

2. A method as claimed in claim 1 including clamping the tubular workpiece at its midsection between a pair of central anvil elements by radially closing the central anvil elements relative to the workpiece.

3. A method as claimed in claim 1 including first bending the workpiece into a generally trapezoidal shape by moving a first pair of forming rollers linearly from a first position adjacent the opposed ends of the one anvil element generally transversely of the axis of the workpiece to a second position past the ends of the one anvil element, and then retracting the first rollers back to their first position after the first bending operation.

4. A method as claimed in claim 3 including second bending the ends of the firstly bent workpiece into first sigmoid curves by moving a second pair of forming rollers having second sigmoid curved peripheries linearly from a first position adjacent the opposed ends of the one anvil element to a second position past the ends of the one anvil element.

5. A method as claimed in claim 4 including third bending the distal end areas of the workpiece into reverse, second sigmoid curves conforming to the peripheries of the second pair of forming rollers by moving a third pair of forming rollers linearly from a first position, adjacent the opposed ends of the one anvil element, adjacent to and past the second pair of forming rollers, and then withdrawing the third pair of forming rollers from the workpiece after the third bending operation.

6. A method as claimed in claim 5 including withdrawing the second pair of forming rollers from the workpiece after the third pair of rollers have been withdrawn from the workpiece.

7. A method as claimed in claim 5 including linearly moving said third pair of forming rollers by retracting hydraulic piston actuators associated with each of the rollers of the third pair of rollers.

8. A method as claimed in claim 4 including linearly moving said first and second pair of forming rollers by expanding hydraulic piston actuators associated with each of the rollers of the first and second pairs of rollers.

9. A method as claimed in claim 1 including forming the distal ends of the fully bent workpiece into a desired orientation by advancing a pair of forming blocks disposed adjacent the position of the distal ends of the fully bent workpiece into engagement with the distal ends of the fully bent workpiece and then withdrawing the forming blocks from the workpiece.

* * * * *